(12) United States Patent
Sosniak

(10) Patent No.: US 8,788,734 B2
(45) Date of Patent: Jul. 22, 2014

(54) METHODS AND DEVICES FOR UNIVERSAL SERIAL BUS PORT EVENT EXTENSION

(75) Inventor: Terence C. Sosniak, Langley (CA)

(73) Assignee: Icron Technologies Corporation, Burnaby (CA)

(*) Notice: Subject to any disclaimer, the term of this patent is extended or adjusted under 35 U.S.C. 154(b) by 378 days.

(21) Appl. No.: 13/229,583

(22) Filed: Sep. 9, 2011

(65) Prior Publication Data

US 2013/0067128 A1    Mar. 14, 2013

(51) Int. Cl.
*G06F 13/42* (2006.01)
*G06F 13/14* (2006.01)

(52) U.S. Cl.
USPC ........... 710/106; 710/305; 710/313; 710/314; 710/315

(58) Field of Classification Search
CPC .... G06F 13/387; G06F 13/4045; G06F 13/42
USPC ................... 710/106, 305, 313–315
See application file for complete search history.

(56) References Cited

U.S. PATENT DOCUMENTS

| | | | |
|---|---|---|---|
| 6,954,808 B2 * | 10/2005 | Russell | 710/62 |
| 7,028,133 B1 * | 4/2006 | Jackson | 710/313 |
| 7,149,833 B2 | 12/2006 | McLeod | |
| 7,246,189 B2 * | 7/2007 | Ulenas | 710/305 |
| 7,587,536 B2 | 9/2009 | McLeod | |
| 2013/0132625 A1 * | 5/2013 | Hall | 710/106 |

* cited by examiner

*Primary Examiner* — Brian Misiura
(74) *Attorney, Agent, or Firm* — Christensen O'Connor Johnson Kindness PLLC

(57) ABSTRACT

Methods and apparatus for implementing a port management protocol which can be used to manage communication between one or more USB devices and a USB host at a distance greater than that allowed by the USB Specifications are provided. In one aspect, a method for prolonging a bus event of a USB device at least until a notification is received that a corresponding bus event has been completed by the USB host is provided; and subsequently exchanging bus traffic between the USB host and USB device upon completion of the bus event by both devices.

36 Claims, 21 Drawing Sheets

| MESSAGE | DIRECTION | DATA | DESCRIPTION |
|---|---|---|---|
| CONNECTED | DFP -> UFP | SPEED | A DEVICE HAS BEEN CONNECTED TO THE DFP, THE SPEED PRE-FETCH HAS BEEN COMPLETED, AND THE DFP IS IN A SUSPEND STATE |
| RESETDETECTED | UFP -> DFP | SPEED | THE SPEED OF A PORT CONNECTED TO THE UFP HAS BEEN DETERMINED. STARTS THE RESET SEQUENCE AT THE DFP BASED ON THE UFP PORT CONDITIONS |
| RESETDONE | UFP -> DFP | SPEED | INDICATES THAT THE UFP HAS COMPLETED THE BUS RESET AND IS IN AN OPERATIONAL STATE. CLEARS THE RESET EXTENSION MECHANISM. |
| RESETDONE | DFP -> UFP | SPEED | INDICATES THAT THE DFP HAS COMPLETED THE BUS RESET AND IS AN OPERATIONAL STATE. |
| SUSPENDDETECTED | UFP -> DFP | -- | INDICATES THAT THE UFP HAS ENTERED A SUSPENDED STATE |
| SUSPENDDETECTED | DFP -> UFP | -- | INDICATES THAT THE DFP HAS ENTERED A SUSPENDED STATE |
| RESUMEDETECTED | UFP -> DFP | -- | INDICATES THAT THE UFP HAS DETECTED RESUME SIGNALING |
| RESUMEDONE | UFP -> DFP | -- | INDICATES THAT THE UFP HAS COMPLETED THE BUS RESUME AND IS IN AN OPERATIONAL STATE. CLEARS THE RESUME EXTENSION MECHANISM. |
| REMOTEWAKEUP | DFP -> UFP | -- | INDICATES THAT THE DEVICE CONNECTED TO THE PORT OF THE DFP HAS INITIATED A RESUME SEQUENCE. |

*Fig. 5.*

METHODS AND DEVICES FOR UNIVERSAL SERIAL BUS PORT EVENT EXTENSION

BACKGROUND

USB is a peripheral interface for attaching a wide variety of computing devices, such as, for example, personal computers, digital telephone lines, monitors, modems, mice, printers, scanners, game controllers, keyboards, and the like. The specifications defining USB (e.g. Intel et al., Universal Serial Bus Specification, Revision 1.0, January 1996; updated as Revision 1.1 in September 1998; further updated as Revision 2.0 in April 2000; further updated as Revision 3.0 in November, 2008, and subsequent updates and modifications—hereinafter collectively referred to as the "USB Specifications", which term can include future modifications and revisions) are non-proprietary and are managed by an open industry organization known as the USB Forum. The USB Specifications establish basic criteria that must be met in order to comply with USB standards. One of ordinary skill in the art will recognize many terms herein from the USB Specifications. Those terms are used herein in a similar manner to their use in the USB Specifications, unless otherwise stated.

It is a requirement of Revision 1.0 of the USB Specification that a single USB domain shall support up to 127 devices operating over a shared medium providing a maximum bandwidth of 12 Mbps. Revision 2.0 increases the maximum bandwidth to 480 Mbps while maintaining compatibility with devices manufactured under the criteria of Revision 1.1. Under the USB Specifications, a host controller that supports a maximum signaling rate of 12 Mbps is referred to as a full-speed host. A host controller that supports a signaling rate of 480 Mbps is referred to as a high-speed host. A full-speed host controller conforming to the USB Specifications supports two classes of devices, namely, low-speed devices and full-speed devices. A high-speed host controller conforming to the USB Specifications supports three classes of devices, namely, low-speed devices, full-speed devices, and high-speed devices. Low-speed devices have a maximum signaling rate of 1.5 Mbps, full-speed devices have a maximum signaling rate of 12 Mbps, and high-speed devices have a maximum signaling rate of 480 Mbps. Revision 3.0 of the USB Specification requires that compatible USB 3.0 devices must implement device framework commands and descriptors as defined in the USB Revision 2.0 Specification.

The USB Specifications provide strict timing guidelines for certain types of communication between a host controller and connected devices. For example, low-level signaling for bus events such as reset events, suspend events, and resume events are driven by signals that use timings that are, for example, shorter than 3 ms. The signaling rate and propagation speed of signals through copper wire limits a distance at which a round trip communication may comply with such timing.

As a further example, with respect to structured packetized signaling, the USB Specifications state that when a full-speed host controller instructs a particular device to place its information onto the shared bus, the requested information must be received by the host controller within 16 full-speed bit-times of the host controller issuing said instruction. Similarly, when a high-speed host controller instructs a particular device to place its information onto the shared bus, the requested information must be received by the host controller within 736 high-speed bit-times of the host controller issuing said instruction. Restriction on the response time ensures that the USB Specifications provide for a high efficiency of bandwidth utilization by limiting the period during which no information is being transmitted. However, these requirements also limit the physical range of USB devices since one bit-time at 12 Mbps, which is one full-speed bit-time, is equivalent to the time taken for an electronic signal to traverse approximately 17 meters of copper cable. One bit-time at 480 Mbps, which is one high-speed bit-time, is equivalent to the time taken for an electronic signal to traverse approximately 440 millimeters of cable.

Although the USB device must respond to a request from the full-speed host controller within 16 full-speed bit-times, 7.5 full-speed bit-times is allocated for delay within a full or low-speed USB device and its associated 5-meter cable. This allocation retains only 8.5 full-speed bit-times at 12 Mbps for additional cable delay. The time represented by 8.5 full-speed bit-times is equivalent to the delay incurred by electronic signals in traversing approximately 144 meters of cable.

For the high-speed host controller, a device must respond to the host controller within 736 high-speed bit-times, and 217 high-speed bit-times of the restricted response time of 736 high-speed bit-times is allocated for delay within a high-speed USB device and its 5-meter cable. This allocation thus retains 519 full-speed bit-times at 480 Mbps for additional cable delay. The time represented by 519 high-speed bit-times represents a distance of 227 meters of cable. However, according to the USB Specifications, a high-speed host must also support full and low-speed devices which operate under the full-speed bus. The time allocated for delay within a full or low-speed USB device and its associated 5-meter cable is 7.5 full-speed bit-times which is equivalent to 300 high-speed bit-times. Therefore, in the case where data is transferred between a high-speed host and a full or low-speed USB device, only 436 bit-times are retained for additional cable delay. The time represented by 436 bit-times at 480 Mbps is equivalent to a cable distance of 190 meters. In order to maintain compatibility with full and low-speed devices, the maximum cable length for high speed is then restricted to 190 meters which does not meet the specified round trip cable length of 200 meters.

Accordingly, under Revision 2.0 of the USB Specification, the distance that a device can be separated from its host is limited to 5 meters. The maximum distance supported by Revision 2.0 is 30 meters, as a USB device may be connected to a series of USB hubs, up to a maximum of five hubs. However, using five hubs and six 5-meter cables, placed between the hubs, to support a USB device at a range of up to 30 meters will generally be an expensive and clumsy solution as it may require use and purchase of otherwise unnecessary hubs and at least two of the five hubs must be provided with external electrical power. In addition, using standard 5-meter cables between hubs would mean that some hubs might have to be placed in insecure and inconvenient locations to cover the longer distance. Further, a range of 30 meters is still limiting for some applications.

Currently, devices that comply with one or more of the USB Specifications are not capable of correctly propagating USB bus events over longer distances. Particularly, a host controller communicating over previous technologies used to span longer distances does not retain the ability to control the state and speed of the system. Therefore, a new method and apparatus are needed to optionally allow for extension of a USB device to a distance greater than five meters from the USB hub to which it is in direct communication, such that USB bus events may be propagated between the USB hub and the USB device despite a greater delay in signal transmission.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one embodiment, a computing device configurable to provide a downstream facing port for allowing a USB device to communicate with a host via an upstream facing port is provided. The downstream facing port is configured to transmit a connected message to the upstream facing port, transmit a signal to the USB device to initiate a reset in response to receiving a reset detected message from the upstream facing port, and extend the reset at least until a reset done message is received from the upstream facing port.

In another embodiment, a method capable of propagating USB events between a host and a device over a distance greater than that allowed by the USB specification is provided. A bus reset is initiated with the device. The bus reset is prolonged at least until a notification is received that a bus reset has been completed by the host, and bus traffic is exchanged with the device upon completion of the bus reset.

In yet another embodiment, a system for communication between a USB-compliant host and a USB-compliant device that are separated by a non-USB communication link is provided. The system comprises an upstream facing port coupled to the host via a USB connection, and a downstream facing port coupled to the device via a USB connection and capable of establishing a communication link to the upstream facing port. The downstream facing port is configured to extend completion of a USB event with the device at least until a notification is received that a corresponding event has been completed between the upstream facing port and the host.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 5 includes a table listing exemplary control messages transmitted over the network 90 between the UFP 202 and the DFP 204 according to various aspects of the present disclosure;

DETAILED DESCRIPTION

In the present disclosure, signals defined by the USB Specifications that are not limited by an upper time bound may be extended in order to overcome increased signal propagation delay between a host and a USB device. For example, signals associated with a bus reset or resume between a USB extension device and a downstream USB device will be extended until notification is received that a bus reset or resume has been completed between a USB extension device and a host, thereby allowing the host to retain control over the bus state while complying with the USB Specifications.

Figure 1:
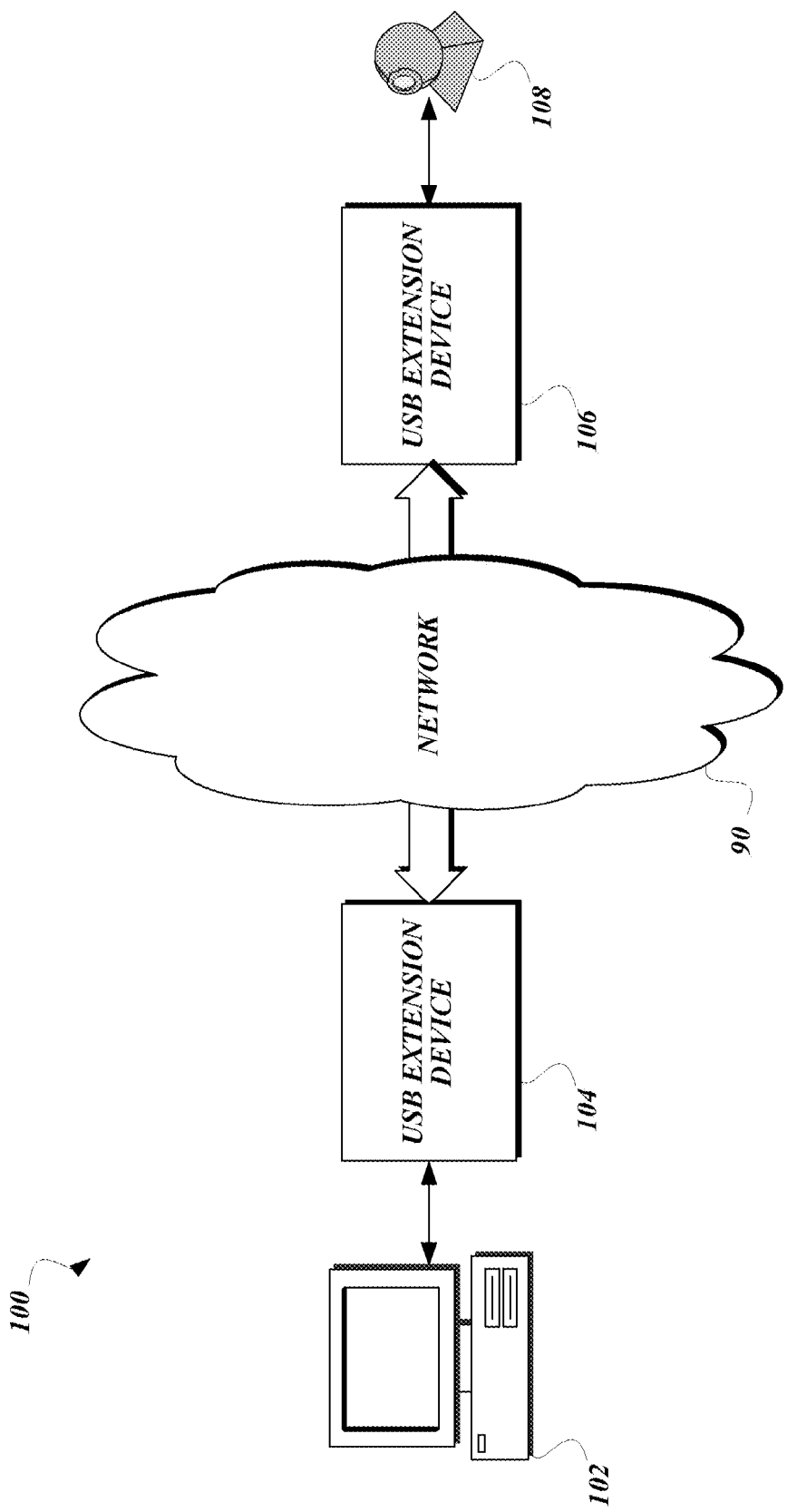
FIG. 1 is a block diagram that illustrates one embodiment of a system 100 for extending USB communication according to various embodiments of the present disclosure.

FIG. 1 is a block diagram that illustrates one embodiment of a system 100 for extending USB communication according to various embodiments of the present disclosure. The system 100 includes a host 102 and a USB device 108. Traditionally, the host 102 and the USB device 108 would be directly connected via a USB cable, and would communicate directly with one another via a protocol that conforms to a USB specification, such as USB 1.0, USB 1.1, or USB 2.0. As discussed above, such a connection would be limited to a distance between the host 102 and the USB device 108 of five meters due to the timing requirements of the USB specification.

The host 102 may be any type of computing device containing a USB host controller. Some examples of suitable hosts 102 may include, but are not limited to, a desktop computer, a laptop computer, a tablet computing device, a server computer, a set-top box, an audio head unit for an automobile, an embedded host, and/or the like. Likewise, the USB device 108 may be any type of device capable of communicating via a USB protocol with a USB host controller. The example illustrated in FIG. 1 is a webcam, but some other examples of suitable USB devices 108 may include, but are not limited to, a human interface device such as a keyboard or mouse, a mass storage device such as a flash drive or external hard drive, a USB-capable medical device, a printer, a USB hub, a wireless controller, and/or the like.

In the present system 100, the host 102 is connected via a USB protocol to an upstream USB extension device 104, and the USB device 108 is connected via a USB protocol to a downstream USB extension device 106. The upstream USB extension device 104 and the downstream USB extension device 106 are communicatively coupled via a network 90 that allows a distance of greater than five meters between the host 102 and the USB device 108. The network 90 and communication thereon may include any suitable networking technology, such as Ethernet, Bluetooth, WiFi, WiMax, the Internet, and/or the like, and any suitable communication medium, such as via physical cables, via wireless spectrum, and/or the like.

In some embodiments, the upstream USB extension device 104 and the downstream USB extension device 106 may be closer to each other than five meters, and/or may be directly connected by a cable instead of via a network 90, but retain the capability of overcoming increased event propagation delays between the host 102 and the USB device 108 as described further below.

Figure 2:
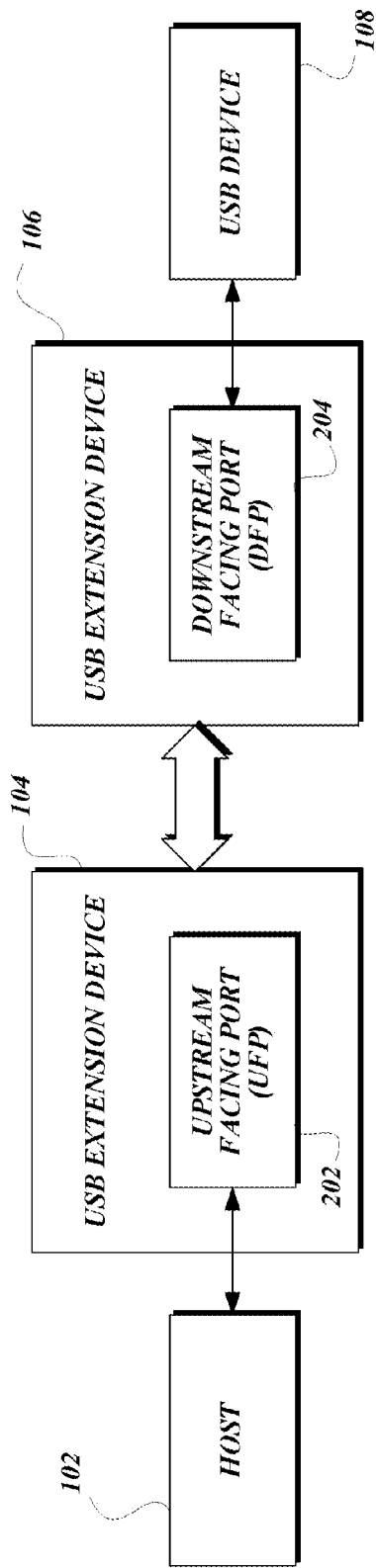
FIG. 2 is a block diagram that illustrates further details of the upstream USB extension device and downstream USB extension device illustrated in FIG. 1.

FIG. 2 is a block diagram that illustrates further details of the upstream USB extension device 104 and downstream USB extension device 106 illustrated in FIG. 1. The upstream USB extension device 104 includes an upstream facing port 202, and the downstream USB extension device 106 includes a downstream facing port 204. As used herein, the terms "upstream facing port" and the corresponding acronym "UFP" may be used interchangeably, as may the terms "downstream facing port" and the corresponding acronym "DFP." The UFP 202 is configured at least to communicate with the host 102 via a USB-standard-compliant protocol, and to exchange messages and USB bus traffic with the DFP 204. The DFP 204 is configured at least to communicate with the device 108 via a USB-standard-compliant protocol, and to exchange messages and USB bus traffic with the UFP 202. The upstream USB extension device 104 and the downstream USB extension device 106 may contain further components such as a power supply, a status LED, a loudspeaker, an input device for switching between UFP functionality and DFP functionality, and/or the like. Since such components and their functions are familiar to those of ordinary skill in the art, they have not been discussed further herein.

As illustrated in FIG. 2, the upstream facing port 202 of the upstream USB extension device 104 is connected to a downstream facing port of a host, and the downstream facing port 204 of the downstream USB extension device 106 is connected to an upstream facing port of a USB device 108. In other embodiments, the upstream facing port 202 of the upstream USB extension device 104 may be connected to a downstream facing port other than one provided by a host, such as a downstream facing port of a hub and/or the like. Likewise, in other embodiments, the downstream facing port 204 of the downstream USB extension device 106 may be connected to an upstream facing port other than one provided by a USB device 108, such as an upstream facing port of a hub and/or the like. The discussion below is primarily in terms of the simple topology illustrated in FIG. 2, but one of ordinary skill in the art will recognize that in some embodiments similar techniques may be used in other topologies without departing from the scope of the present disclosure.

Figure 3:
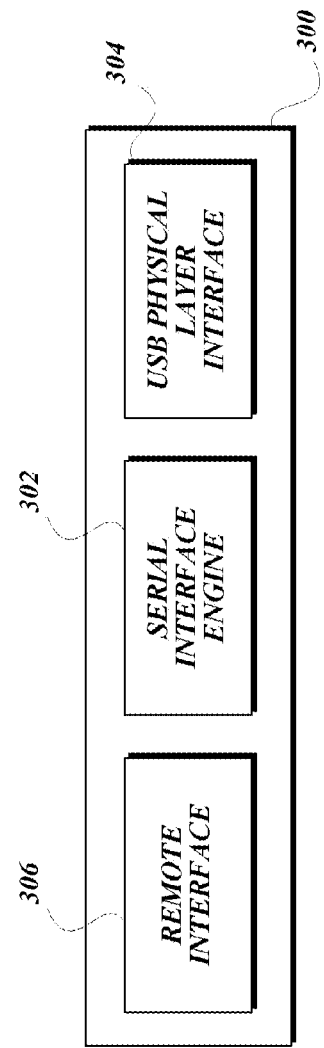
FIG. 3 is a block diagram that illustrates an exemplary embodiment of a port device 300 according to various aspects of the present disclosure.

FIG. 3 is a block diagram that illustrates an exemplary embodiment of a port device 300 according to various aspects of the present disclosure. In some embodiments, the port device 300 may be constructed to provide services of an upstream facing port 202, and in some embodiments the port device 300 may be constructed to provide services of a downstream facing port 204. In some embodiments, the port device 300 may include instructions to provide services of both an upstream facing port 202 and a downstream facing port 204, wherein the particular port services that are provided are determined by a user configuration such as a jumper switch, a firmware setting, and/or the like.

As illustrated, the port device 300 includes a serial interface engine 302, a USB physical layer interface 304, and a remote interface 306. In some embodiments, the serial interface engine 302 may be configured to provide and/or execute the logic discussed below with regard to the UFP 202 and/or the DFP 204. The serial interface engine 302 may instruct the USB physical layer interface 304 to apply the appropriate electrical signals to the USB physical layer in order to communicate with the USB device 108 or the host 102. Likewise, the serial interface engine 302 may instruct the remote interface 306 to exchange information with the remote USB extension device.

In one embodiment, the serial interface engine 302 may be implemented within a logic device such as a PLD, an ASIC, a FPGA, and/or the like. In other embodiments, the serial interface engine 302 may be implemented within a computing device having at least one processor and a memory containing computer-executable instructions that, if executed by the at least one processor, cause the serial interface engine 302 to perform the actions discussed below; a dedicated digital hardware device implemented, for example, as a state machine configured to perform the actions described; within an application specific processor; and/or within any other suitable computing device.

In some embodiments, logic of actions attributed to a USB extension device is executed by a serial interface engine 302, which then instructs a USB physical layer interface 304 and/ or a remote interface 306 to perform the appropriate communication steps associated with the logic. Throughout the discussion below, such actions may simply be described as being performed by the UFP 202 or the DFP 204 as if it was a single device for ease of discussion. One of ordinary skill in the art will recognize that actions attributed directly to the UFP 202 or the DFP 204 may actually be performed by a serial interface engine 302, a USB physical layer interface 304, a remote interface 306, and/or some other component of the USB extension device.

Figure 4A:
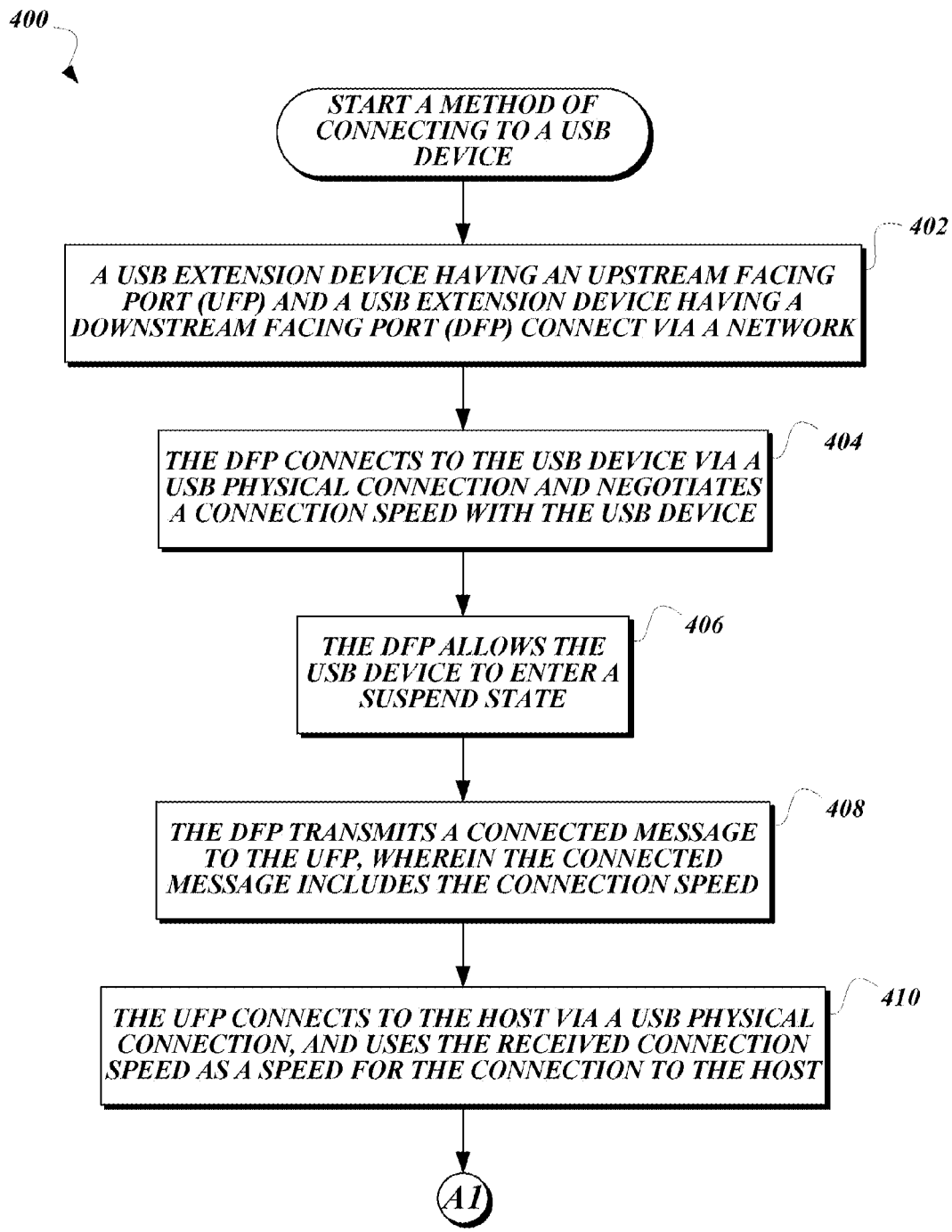
FIGS. 4A-4B include a flowchart that illustrates one embodiment of a method 400 of connecting to a USB device according to various aspects of the present disclosure.
Figure 4B:
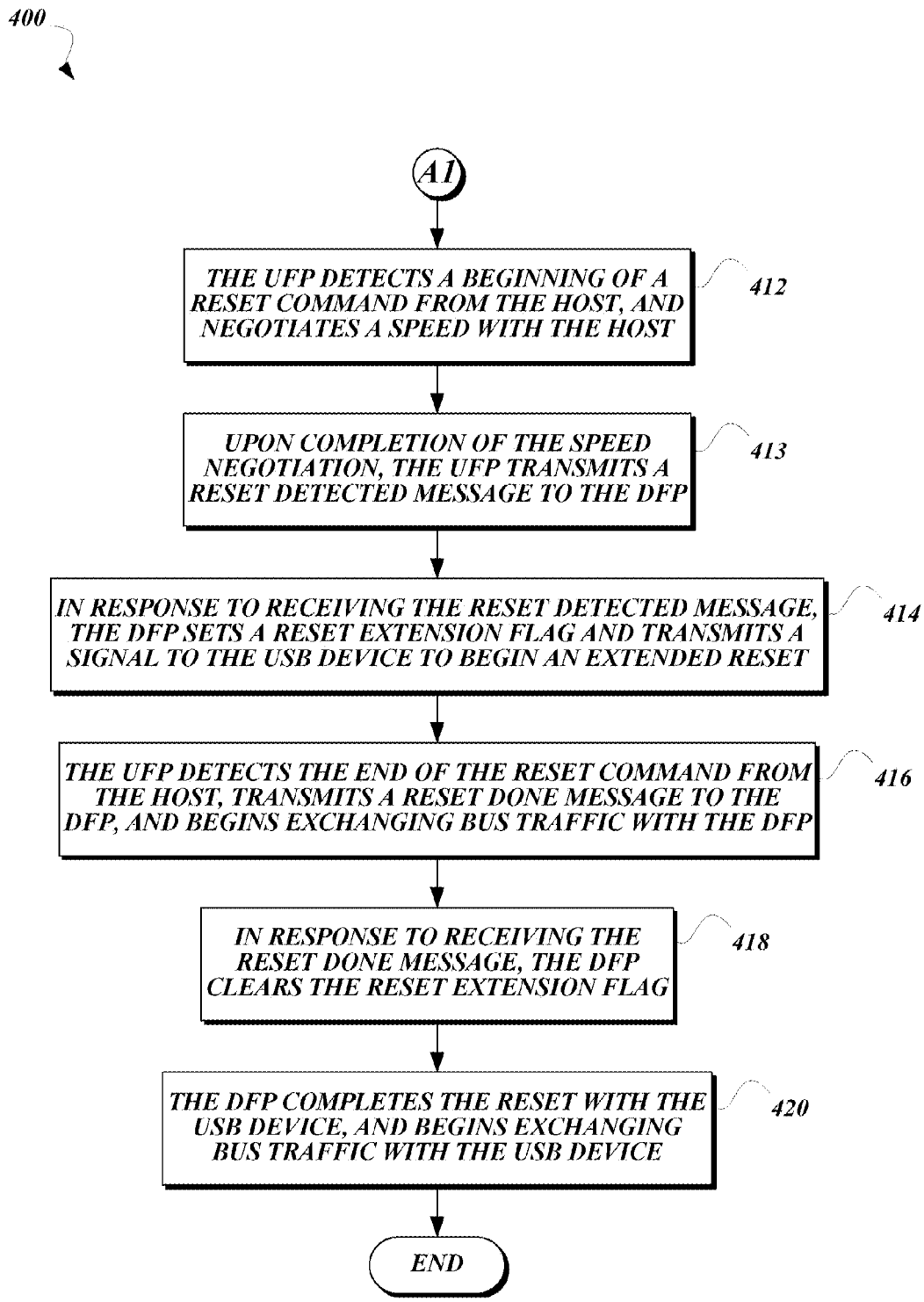

FIGS. 4A-4B include a flowchart that illustrates one embodiment of a method 400 of connecting to a USB device according to various aspects of the present disclosure. From a start block, the method 400 proceeds to block 402, where a USB extension device 104 having an upstream facing port 202 and a USB extension device 106 having a downstream facing port 204 connect via a network. As described above, the network may include any suitable networking technology. In one exemplary embodiment, the USB extension device 104 and USB extension device 106 may establish a TCP/IP connection over a local area network, but any other suitable networking technology may be used instead of or in addition to this technique.

At block 404, the downstream facing port 204 connects to the USB device 108 via a USB physical connection and negotiates a connection speed with the USB device 108. In some embodiments, the connection speeds may be one of high speed, full speed, and low speed, as specified by the related USB specifications. Though the signals related to the events discussed herein may vary depending on the detected speed, the logical steps performed for each speed are similar and they may therefore be discussed together. Further details of the signals transmitted based on the detected speed may be found in FIGS. 6A-6B, 7A-7B, 9, 10, 12, 13, 15A-15B, 16, and 18. Next, at block 406, the downstream facing port 204 allows the USB device 108 to enter a suspend state as defined by the appropriate USB protocol.

The method 400 then proceeds block 408, where the downstream facing port 204 transmits a connected message to the upstream facing port 202, wherein the connected message includes the connection speed. In one embodiment, the actions described above with respect to block 402 wherein the upstream facing port 202 and the downstream facing port 204 connect via a network may happen at any point prior to block 408, and do not necessarily occur before the actions described in block 404 and/or block 406.

Next, in block 410, the upstream facing port 202 connects to the host 102 via a USB physical connection, and uses the received connection speed as a speed for the connection to the host 102. In other words, the upstream facing port 202 connects to the host 102 at a speed that matches the speed at which the downstream facing port 204 is connected to the USB device 108. For example, if the downstream facing port 204 had connected to the USB device 108 at high speed then the upstream facing port 202 connects to the host 102 at high speed, and if the downstream facing port 204 had connected to the USB device 108 at full speed then the upstream facing port 202 connects to the host 102 at full speed. The method 400 then proceeds to a continuation terminal ("terminal A1").

From terminal A1 (FIG. 4B), the method 400 proceeds to block 412, where the upstream facing port 202 detects a beginning of a reset command from the host 102, and negotiates a speed with the host 102. At block 413, upon completion of the speed negotiation, the upstream facing port 202 transmits a reset detected message to the downstream facing port. In some embodiments, the reset detected message may include information indicating the speed negotiated between the upstream facing port 202 and the host 102. This may be useful in a situation where, for example, the device 108 and the downstream facing port 204 negotiated high speed, but the host 102 only supports low speed and full speed. In this situation, the upstream facing port 202 and the host 102 may negotiate full speed, and the reset detected message provides the speed information to the downstream facing port 204 so that the downstream facing port 204 may negotiate a similar speed with the USB device 108 during a subsequent extended reset operation.

At block 414, in response to receiving the reset detected message, the downstream facing port 204 sets a reset extension flag and transmits a signal to the USB device 108 to begin an extended reset. Though the relevant USB specifications require strict timing of signals associated with a beginning and an end of a reset, the duration of the reset signal itself is not strictly defined by the relevant USB specifications. Accordingly, the downstream facing port 204 may extend the length of the reset operation with the USB device 108 until after the reset operation between the upstream facing port 202 and the host 102 has been completed by extending the duration of the reset signal. At block 414, the downstream facing port 204 will continue to transmit one or more signals associated with the reset operation to extend the reset operation.

Next, at block 416, the upstream facing port 202 detects the end of the reset command from the host 102, transmits a reset done message to the downstream facing port 204, and begins exchanging bus traffic from the host 102 with the downstream facing port 204. In some embodiments, the downstream facing port 204 buffers the bus traffic received from the upstream facing port 202 until the connection with the USB device 108 is ready.

The downstream facing port 204 does not necessarily immediately conclude the reset operation upon receiving the reset done message. Instead, the reset extension flag is used by the downstream facing port 204 to indicate whether the reset operation should continue to be extended, or whether the downstream facing port 204 should begin to conclude the reset operation. This allows proper operation in a case where, for example, due to transmission timing between the upstream facing port 202 and the downstream facing port 204 (or for some other reason), a time between receipt of the reset detected message and receipt of the reset done message by the downstream facing port 204 is shorter than the minimum time needed by the downstream facing port 204 to complete the reset operation with the USB device 108 according to the appropriate USB specification.

Hence, the method 400 proceeds to block 418 where, in response to receiving the reset done message, the downstream facing port 204 clears the reset extension flag. Next, at block 420, the downstream facing port 204 completes the reset with the USB device 108, and begins exchanging bus traffic with the USB device 108 that had been exchanged with the upstream facing port 202. The bus traffic may continue to be exchanged between the host 102 and the USB device 108 via the upstream facing port 202 and the downstream facing port 204 as the method 400 proceeds to an end block and terminates.

FIG. 5 includes a table listing exemplary control messages transmitted over the network 90 between the UFP 202 and the DFP 204 according to various aspects of the present disclosure. A name of the control message, a direction (from the DFP 204 to the UFP 202, or from the UFP 202 to the DFP 204), a description of included data (if any), and a description of the meaning or effect of the message are included in the table. Particular examples of transmission of the control messages described in the table may be found in the sequence diagrams discussed below.

Figure 6A:
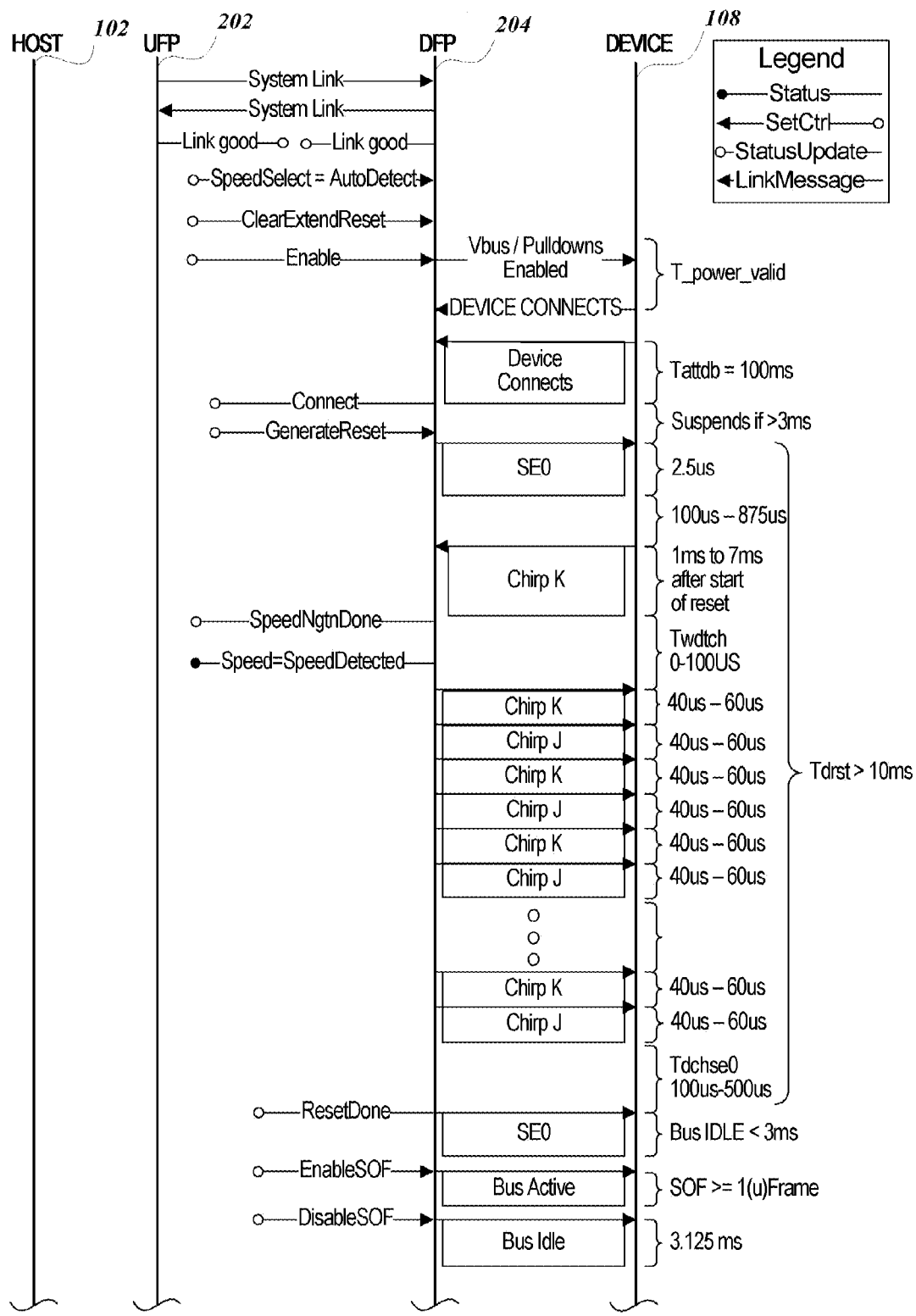
FIGS. 6A-6B are a sequence diagram that illustrates further details of signals and messages transmitted during an exemplary embodiment of a method similar to the method 400 illustrated in FIGS. 4A-4B, in a case where the speed negotiated with the USB device 108 is high speed.
Figure 6B:
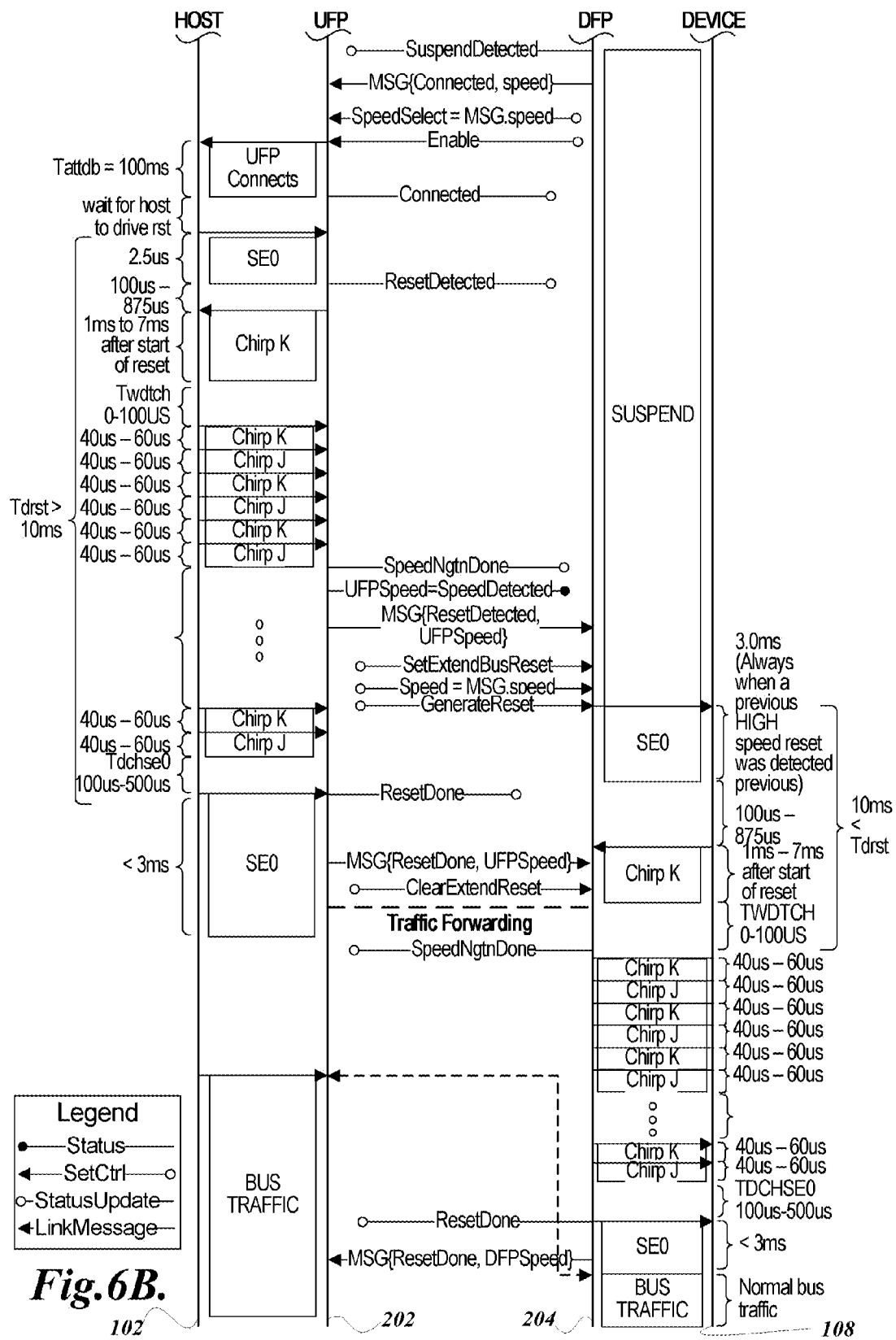

FIGS. 6A-6B are a sequence diagram that illustrates further details of signals and messages transmitted during an exemplary embodiment of a method similar to the method 400 illustrated in FIGS. 4A-4B, in a case where the speed negotiated with the USB device 108 is high speed. The bold vertical lines represent the host 102, the upstream facing port 202, the downstream facing port 204, and the USB device 108. Wavy continuation lines intersecting the bold vertical lines at the top or bottom of the drawing indicate a continuation to a neighboring drawing. Arrows extending completely from one vertical line to another vertical line indicate messages (between the UFP 202 and the DFP 204) or signals (between the host 102 and UPF 202, or between the DFP 204 and the USB device 108), with the direction of the arrow indicating the direction of transmission of the signal. Arrows that do not extend completely from one vertical line to another indicate local function or method calls on the device pointed to by the arrow. Lines with a closed circular end indicate a status of the device the line touches, and lines with an empty circular end indicate a status update on the device the line touches. Boxes between the host 102 and the UFP 202, and between the DFP 204 and the USB device 108, indicate the content of a signal being transmitted. Though the vertical axis of the sequence diagram indicates the sequence in which the signals are transmitted in the illustrated exemplary embodiment, distances on the vertical axis are not to scale with respect to time. Where relevant, curly brace callouts to the right of the device 108 and to the left of the host 102 provide duration information, and/or other information concerning the associated signals.

Figure 7A:
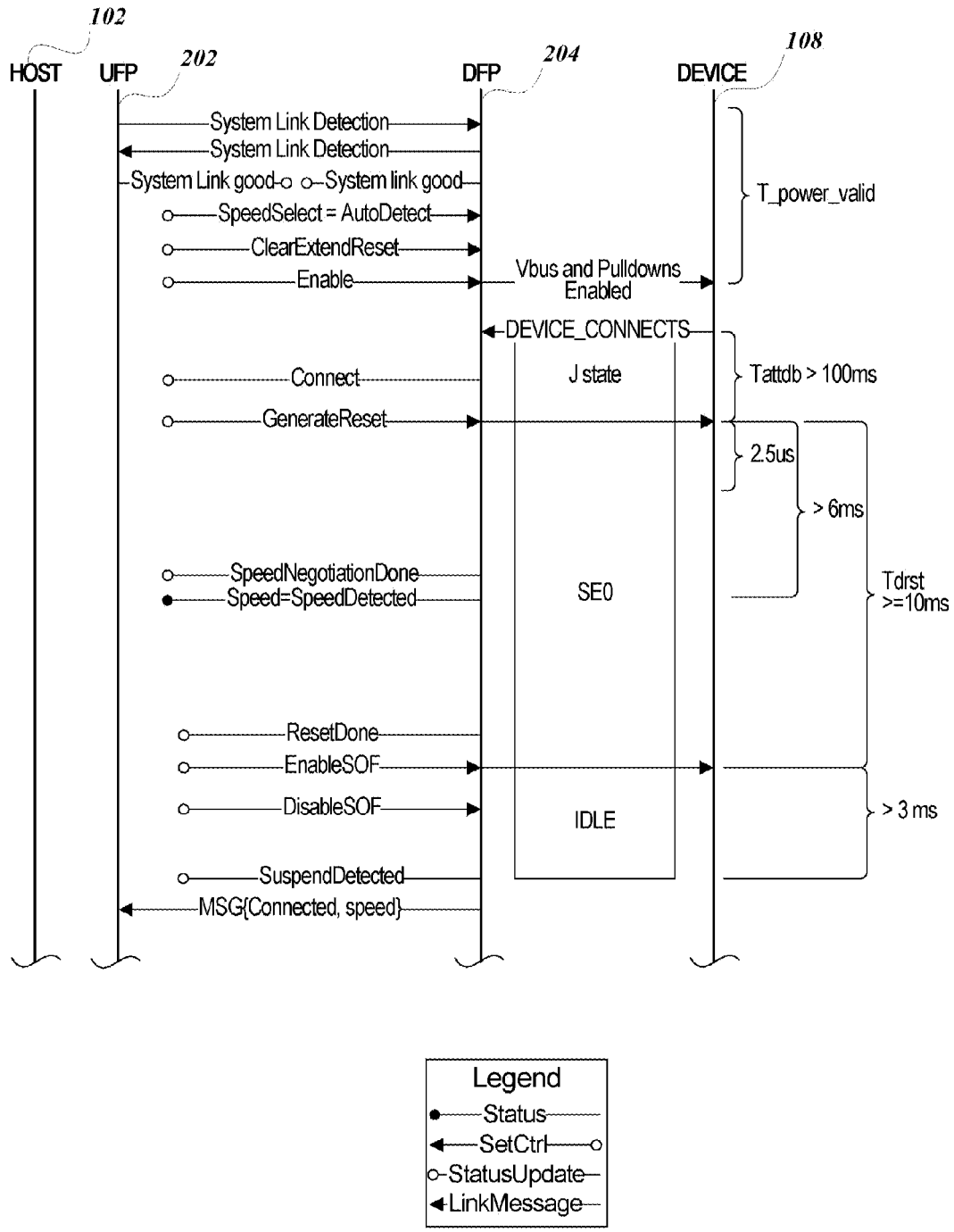
FIGS. 7A-7B are a sequence diagram that illustrates further details of signals and messages transmitted during an exemplary embodiment of a method similar to the method 400 illustrated in FIGS. 4A-4B, in a case where the speed negotiated with the USB device 108 is full speed or low speed.
Figure 7B:
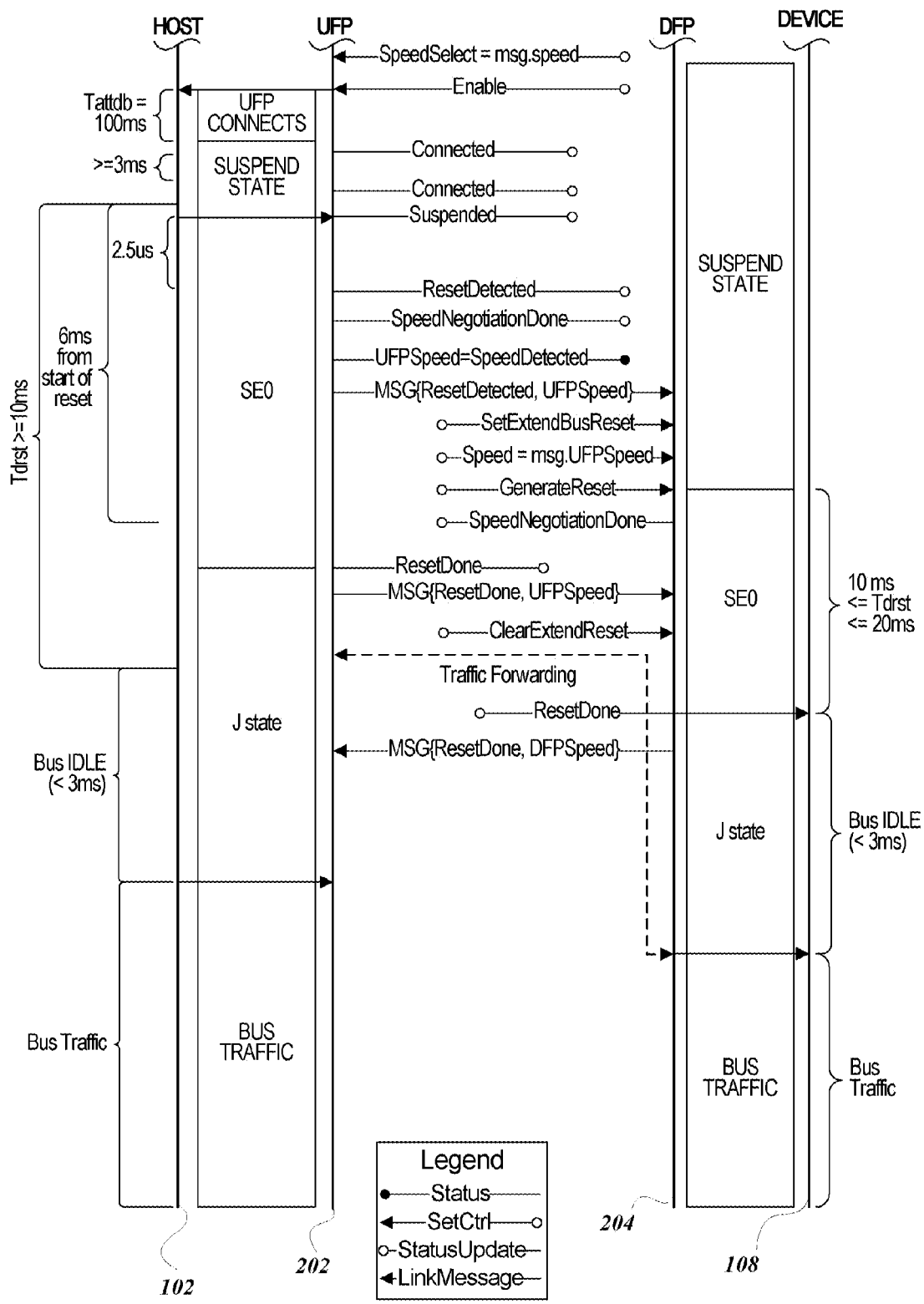

FIGS. 7A-7B are a sequence diagram that illustrates further details of signals and messages transmitted during an exemplary embodiment of a method similar to the method 400 illustrated in FIGS. 4A-4B, in a case where the speed negotiated with the USB device 108 is full speed or low speed. The illustrated vertical lines, wavy continuation lines, arrows, open circle lines, closed circle lines, boxes, curly brace callouts, vertical sequence, vertical scale, and the like are similar to those discussed above with respect to FIGS. 6A-6B.

As the above description is adequate for one of ordinary skill in the art to interpret the illustration of signals transmitted between the host 102, the UFP 202, the DFP 204, and the USB device 108 included in FIGS. 6A-6B and 7A-7B, no further textual description of FIG. 6A-6B or 7A-7B is provided herein for the sake of brevity.

Figure 8:
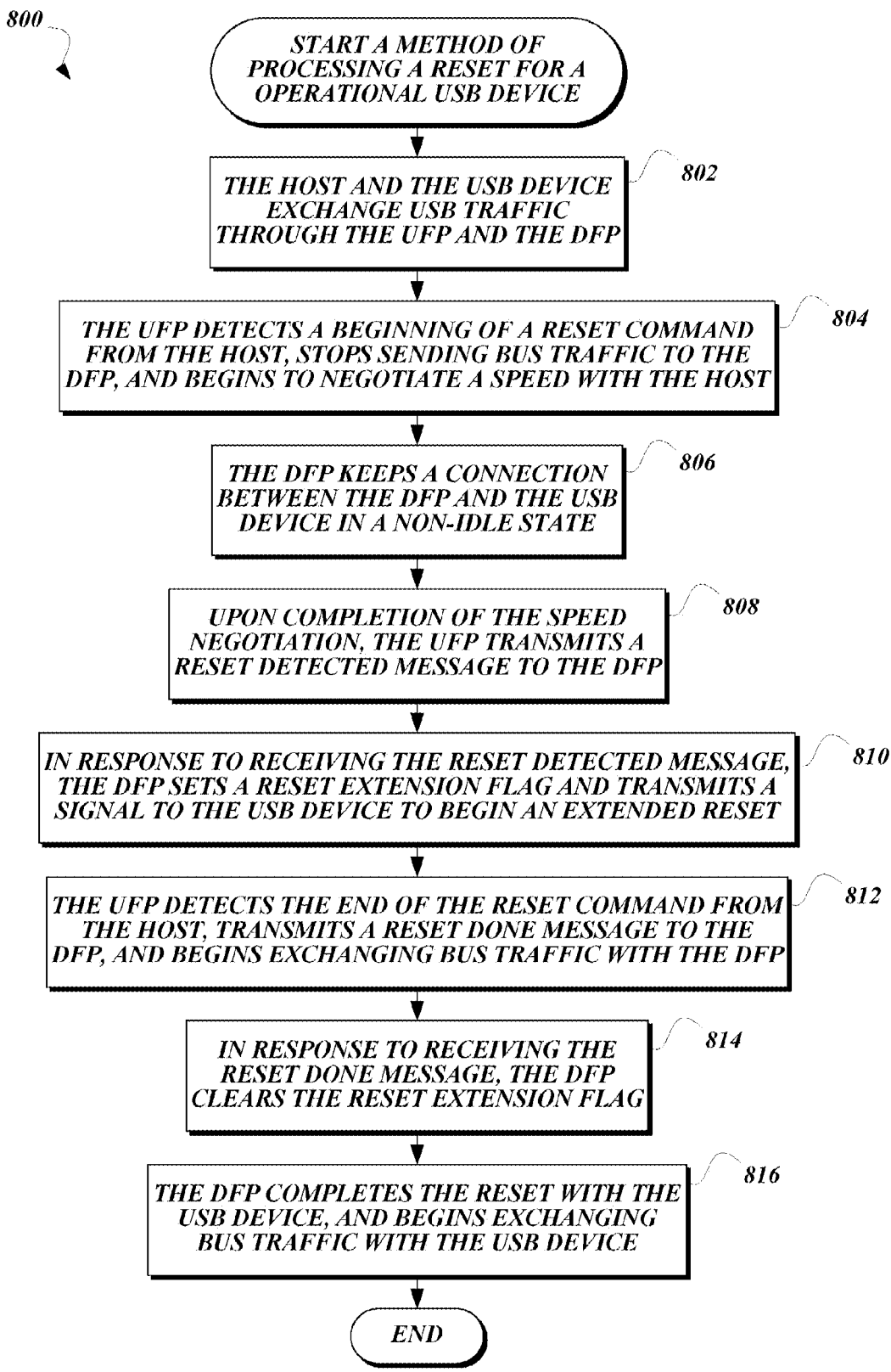
FIG. 8 is a flowchart that illustrates one embodiment of a method 800 of processing a reset for an operational USB device 108 according to various aspects of the present disclosure.

FIG. 8 is a flowchart that illustrates one embodiment of a method 800 of processing a reset for an operational USB device 108 according to various aspects of the present disclosure. That is, the method 800 processes a reset issued by a host 102 that is exchanging bus traffic with a USB device 108 via an upstream facing port 202 and a downstream facing port 204. From a start block, the method 800 proceeds to block 802, where the host 102 and the USB device 108 exchange USB traffic through the upstream facing port 202 and the downstream facing port 204, as outlined above. Next, at block 804, the upstream facing port 202 detects a beginning of a reset command from the host, stops sending bus traffic to the downstream facing port 204, and begins to negotiate a speed with the host 102.

At block 806 the downstream facing port 204, which is no longer receiving bus traffic from the upstream facing port 202, keeps a connection between the downstream facing port 204 and the USB device 108 in a non-idle state. That is, the downstream facing port 204 may continue to transmit appropriate keep-alive signals to the USB device 108, or may exchange standard bus traffic with the USB device 108 without passing the bus traffic through to the upstream facing port 202.

From this point, the further processing of the reset command in method 800 is similar to the processing of the reset command described in method 400. At block 808, upon completion of the speed negotiation, the upstream facing port 202 transmits a reset detected message to the downstream facing port 204. At block 810, in response to receiving the reset detected message, the downstream facing port 204 sets a reset extension flag and transmits a signal to the USB device 108 to begin an extended reset. The method 800 then proceeds to block 812, where the upstream facing port 202 detects the end of the reset command from the host 102, transmits a reset done message to the downstream facing port 204, and begins exchanging bus traffic with the downstream facing port 204. At block 814, in response to receiving the reset done message, the downstream facing port 204 clears the reset extension flag. Next, at block 816, the downstream facing port 204 completes the reset with the USB device 108, and begins exchanging bus traffic with the USB device 108. While bus traffic may continue to be exchanged between the host 102 and the USB device 108 via the upstream facing port 202 and the downstream facing port 204, the method 800 proceeds to an end block and terminates.

Figure 9:
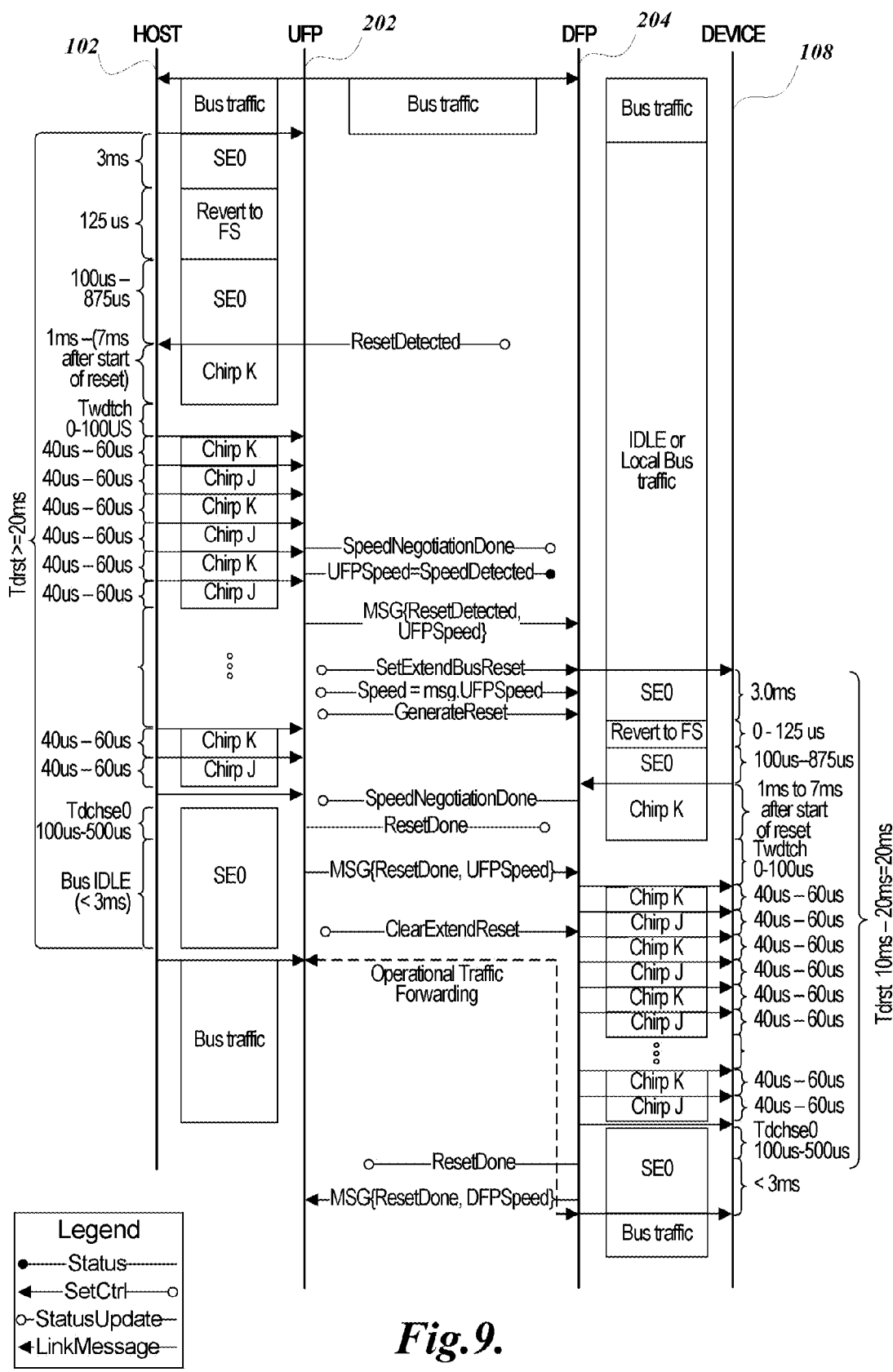
FIG. 9 is a sequence diagram that illustrates further details of signals and messages transmitted during an exemplary embodiment of a method similar to the method 800 illustrated in FIG. 8, in a case where the speed negotiated with the USB device 108 is high speed.
Figure 10:
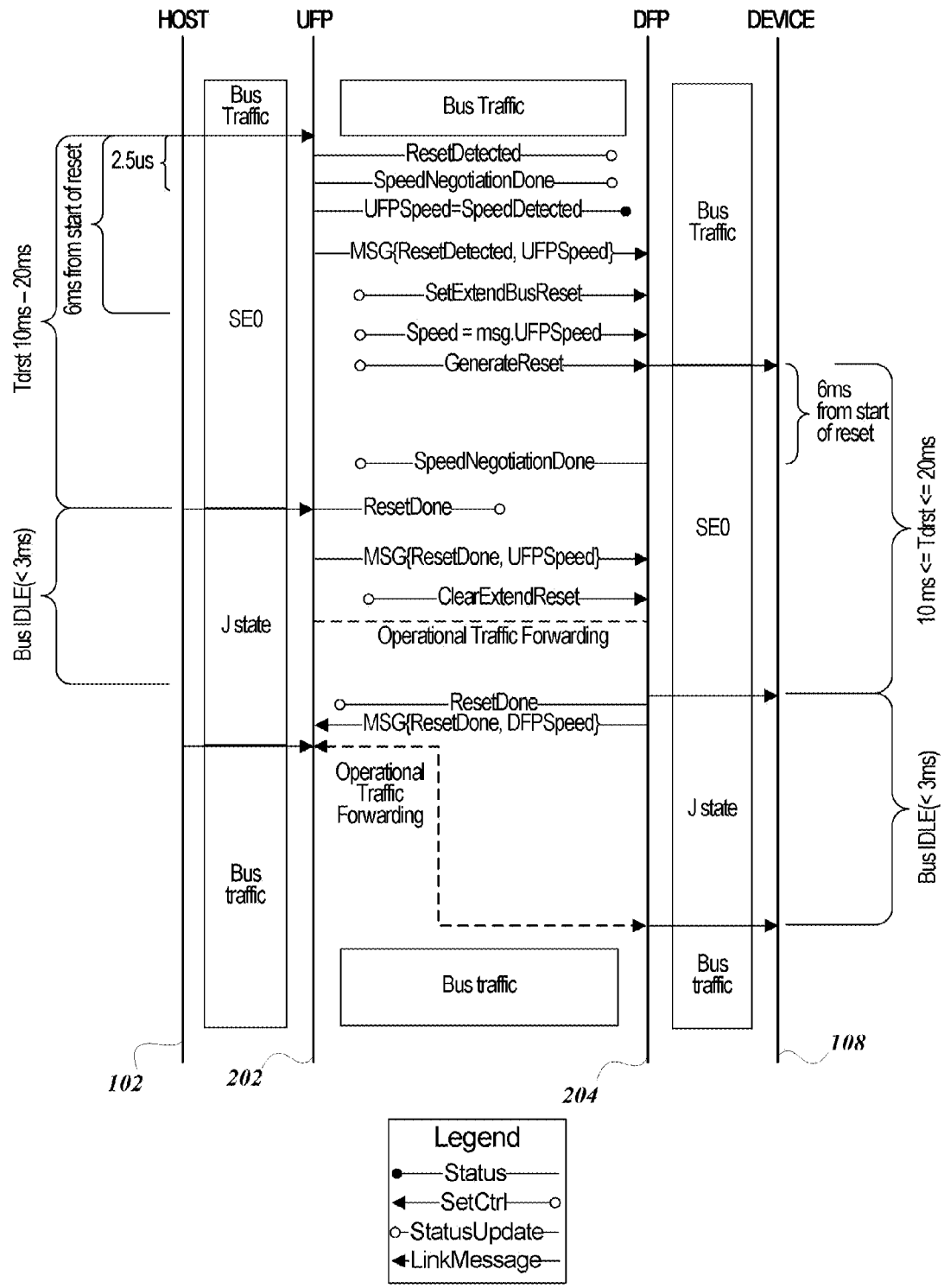
FIG. 10 is a sequence diagram that illustrates further details of signals and messages transmitted during an exemplary embodiment of a method similar to the method 800 illustrated in FIG. 8, in a case where the speed negotiated with the USB device 108 is full speed or low speed.

FIG. 9 is a sequence diagram that illustrates further details of signals and messages transmitted during an exemplary embodiment of a method similar to the method 800 illustrated in FIG. 8, in a case where the speed negotiated with the USB device 108 is high speed. FIG. 10 is a sequence diagram that illustrates further details of signals and messages transmitted during an exemplary embodiment of a method similar to the method 800 illustrated in FIG. 8, in a case where the speed negotiated with the USB device 108 is full speed or low speed. The illustrated vertical lines, wavy continuation lines, arrows, open circle lines, closed circle lines, boxes, curly brace callouts, vertical sequence, vertical scale, and the like are similar to those discussed above with respect to FIGS. 6A-6B. As the above description is adequate for one of ordinary skill in the art to interpret the illustration of signals transmitted between the host 102, the UFP 202, the DFP 204, and the USB device 108 included in FIGS. 9 and 10, no further textual description of FIG. 9 or 10 is provided herein for the sake of brevity.

Figure 11:
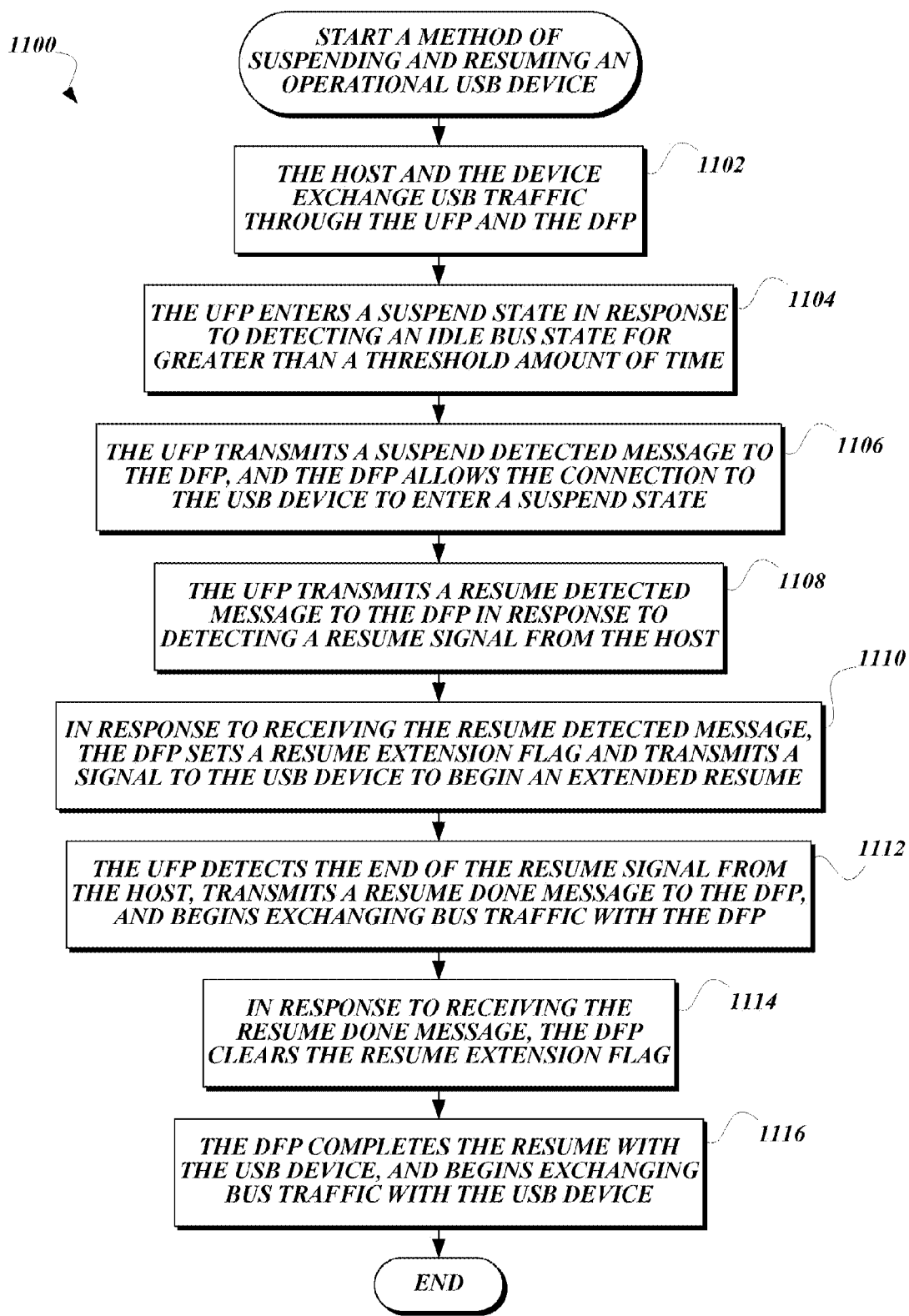
FIG. 11 is a flowchart that illustrates one embodiment of a method 1100 of suspending and resuming an operational USB device 108 according to various aspects of the present disclosure.

FIG. 11 is a flowchart that illustrates one embodiment of a method 1100 of suspending and resuming an operational USB device 108 according to various aspects of the present disclosure. As with method 800 discussed above, the method 1100 processes events issued by a host 102 that is exchanging bus traffic with a USB device 108 via an upstream facing port 202 and a downstream facing port 204. As with the reset event processing discussed above, the method 1100 includes an extension of a resume event by the downstream facing port 204 where appropriate to ensure that the resume event is completed for the connection between the downstream facing port 204 and the USB device 108 after the resume event is completed for the connection between the host 102 and the upstream facing port 202, while maintaining compliance with all applicable USB specifications.

From a start block, the method 1100 proceeds to block 1102, where the host 102 and the USB device 108 exchange USB traffic through the upstream facing port 202 and the downstream facing port 204, as outlined above. Next, at block 1104, the upstream facing port 202 enters a suspend state in response to detecting an idle bus state for greater than a threshold amount of time. One of ordinary skill in the art will recognize that the idle bus state, as well as the threshold amount of time and the criteria for entering the suspend state are contained in the relevant USB specifications. The method 1100 then proceeds to block 1106, where the upstream facing port 202 transmits a suspend detected message to the downstream facing port 204, and the downstream facing port 204 allows the connection to the USB device 108 to enter a suspend state.

At this point, both the connection between the upstream facing port 202 and the host 102, as well as the connection between the downstream facing port 204 and the device 108, are in a suspend state. This state may persist for an arbitrary amount of time, until the method 1100 proceeds to block 1108, where the upstream facing port 202 transmits a resume detected message to the downstream facing port 204 in response to detecting a resume signal from the host 102.

At block 1110, in response to receiving the resume detected message, the downstream facing port 204 sets a resume extension flag and transmits a signal to the USB device 108 to begin an extended resume. Similar to the discussion above with respect to the reset extension flag and the extended reset, the duration of a resume signal is not strictly defined by the relevant USB specifications. Accordingly, the downstream facing port 204 may extend the length of the resume operation with the USB device 108 until after the resume operation between the upstream facing port 202 and the host 102 has been completed by extending the duration of the resume signal. Accordingly, at block 1110, the downstream facing port 204 will continue to transmit one or more signals associated with the resume operation to extend the resume operation.

Next, at block 1112, the upstream facing port 202 detects the end of the resume signal from the host 102, transmits a resume done message to the downstream facing port 204, and begins exchanging bus traffic with the downstream facing port 204. The downstream facing port 204 may buffer the bus traffic until the connection between the downstream facing port 204 and the USB device 108 is ready.

The method 1100 then proceeds to block 1114, where, in response to receiving the resume done message, the downstream facing port 204 clears the resume extension flag. As with the reset extension flag, the resume extension flag is used by the downstream facing port 204 to indicate when it is appropriate to allow the resume event to complete, without forcing the resume event to complete before a minimum amount of time specified in the relevant USB specification. Next, at block 1116, the downstream facing port 204 completes the resume with the USB device 108, and begins exchanging bus traffic with the USB device 108. The method 1100 then continues to an end block and terminates while the host 102 and the USB device 108 continue to exchange bus traffic.

Figure 12:
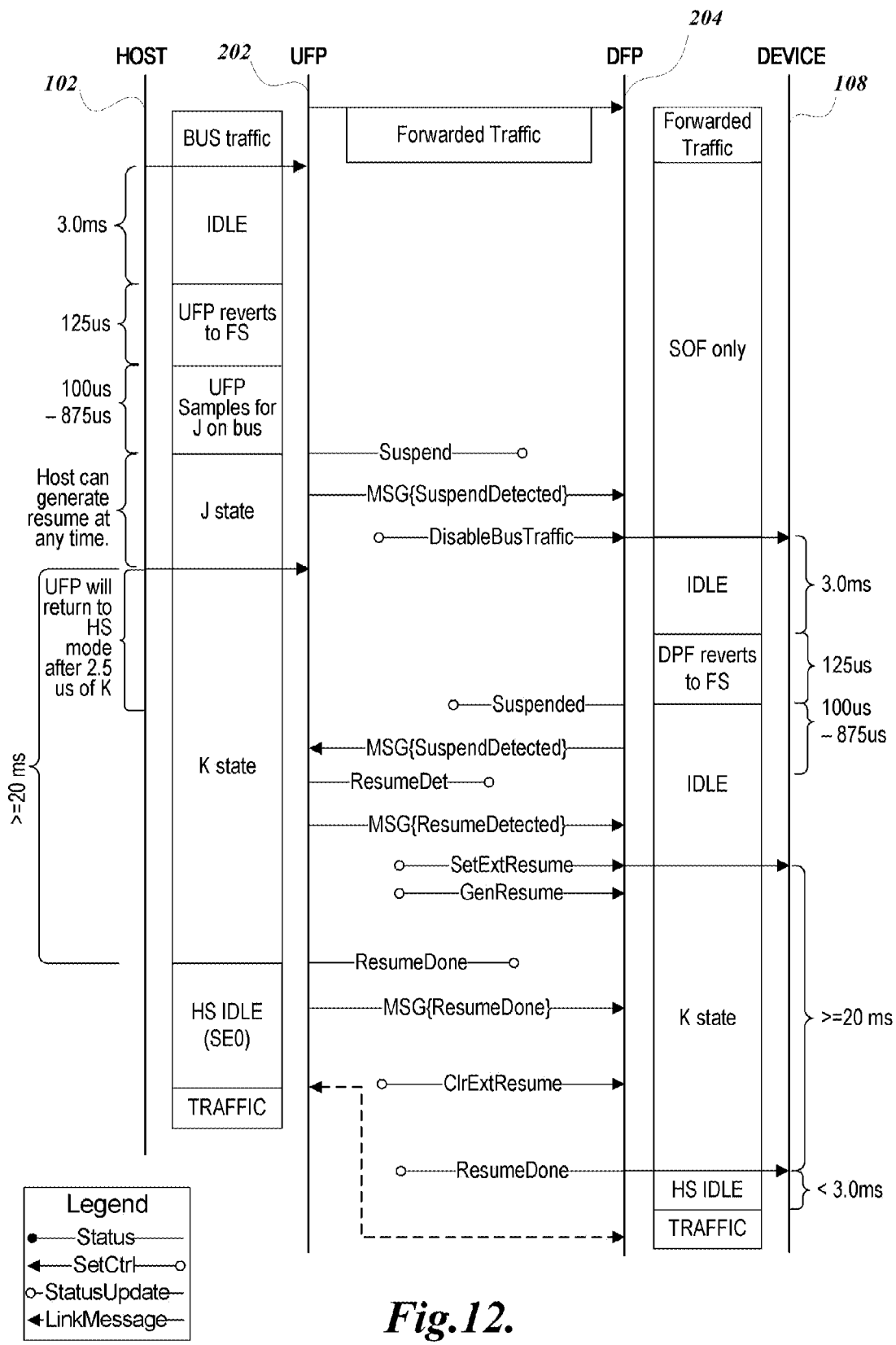
FIG. 12 is a sequence diagram that illustrates further details of signals and messages transmitted during an exemplary embodiment of a method similar to the method 1100 illustrated in FIG. 11, in a case where the USB device 108 communicates with the downstream facing port 204 at high speed.
Figure 13:
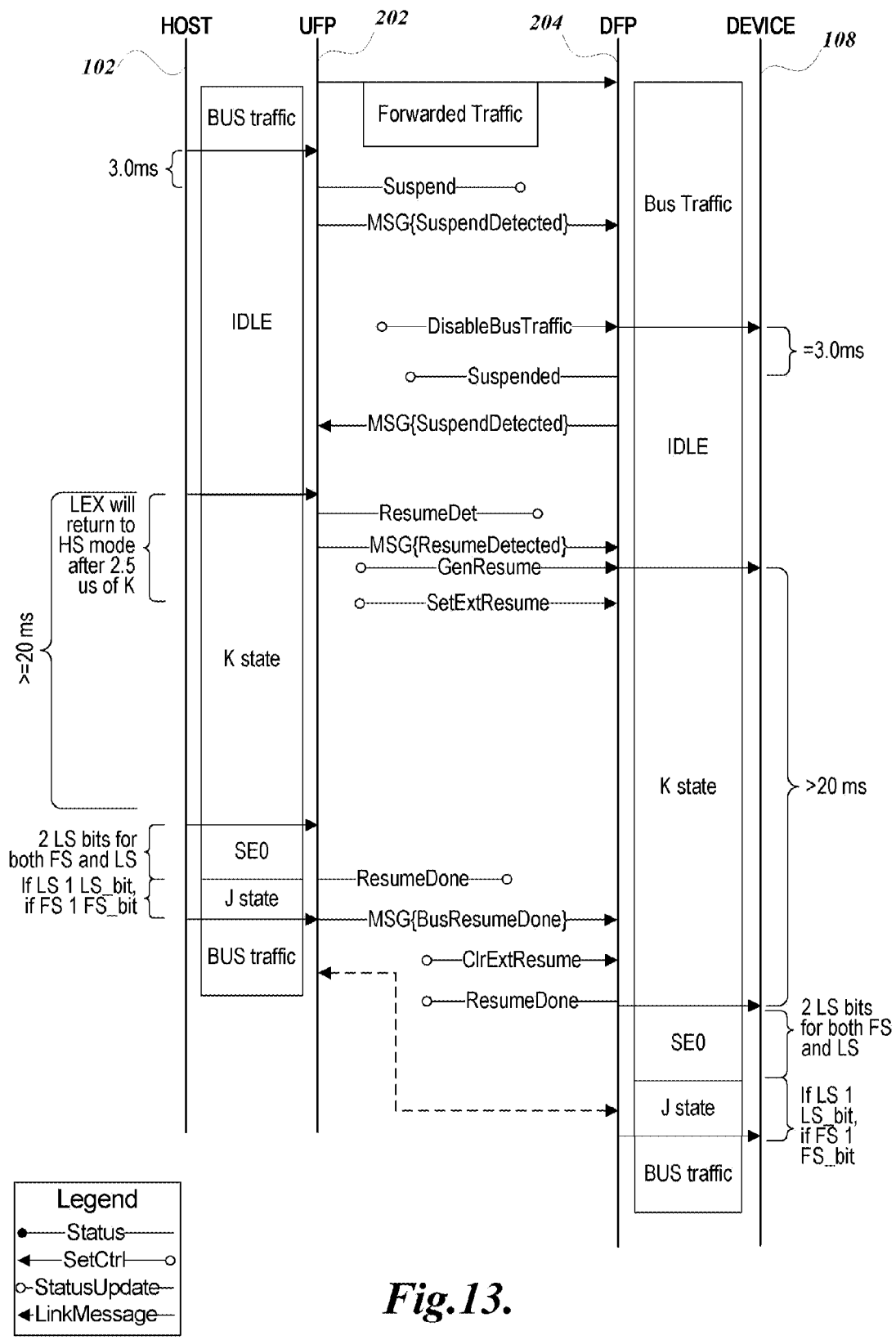
FIG. 13 is a sequence diagram that illustrates further details of signals and messages transmitted during an exemplary embodiment of a method similar to the method 1100 illustrated in FIG. 11, in a case where the USB device 108 communicates with the downstream facing port 204 at full speed or low speed.

FIG. 12 is a sequence diagram that illustrates further details of signals and messages transmitted during an exemplary embodiment of a method similar to the method 1100 illustrated in FIG. 11, in a case where the USB device 108 communicates with the downstream facing port 204 at high speed. FIG. 13 is a sequence diagram that illustrates further details of signals and messages transmitted during an exemplary embodiment of a method similar to the method 1100 illustrated in FIG. 11, in a case where the USB device 108 communicates with the downstream facing port 204 at full speed or low speed. The illustrated vertical lines, wavy continuation lines, arrows, open circle lines, closed circle lines, boxes, curly brace callouts, vertical sequence, vertical scale, and the like are similar to those discussed above with respect to FIGS. 6A-6B. As the above description is adequate for one of ordinary skill in the art to interpret the illustration of signals transmitted between the host 102, the UFP 202, the DFP 204, and the USB device 108 included in FIGS. 12 and 13, no further textual description of FIG. 12 or 13 is provided herein for the sake of brevity.

Figure 14:
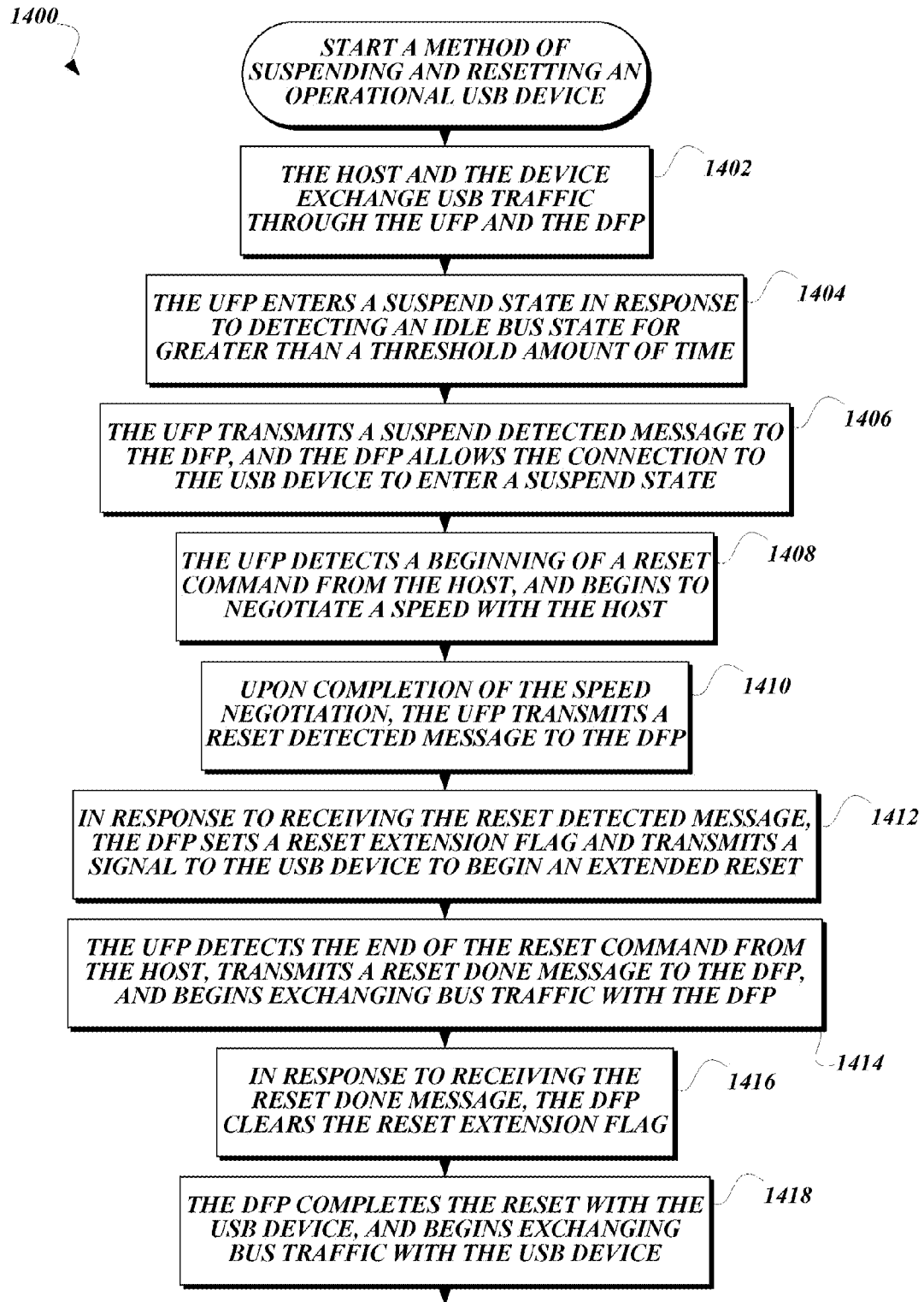
FIG. 14 is a flowchart that illustrates one embodiment of a method 1400 of suspending and resetting an operational USB device 108 according to various aspects of the present disclosure.

FIG. 14 is a flowchart that illustrates one embodiment of a method 1400 of suspending and resetting an operational USB device 108 according to various aspects of the present disclosure. As with methods 800 and 1100 discussed above, the method 1400 processes events issued by a host 102 that is exchanging bus traffic with a USB device 108 via an upstream facing port 202 and a downstream facing port 204. Similar to the methods discussed above, the method 1400 includes an extension of a reset event by the downstream facing port 204 where appropriate to ensure that the reset event is completed for the connection between the downstream facing port 204 and the USB device 108 after the reset event is completed for the connection between the host 102 and the upstream facing port 202, while maintaining compliance with all applicable USB specifications.

The beginning of method 1400 is similar to the beginning of method 1100, in that both methods begin with entering a suspend state. From a start block, the method 1400 proceeds to block 1402, where the host 102 and the USB device 108 exchange USB traffic through the upstream facing port 202 and the downstream facing port 204, as outlined above. Next, at block 1404, the upstream facing port 202 enters a suspend state in response to detecting an idle bus state for greater than a threshold amount of time. One of ordinary skill in the art will recognize that the idle bus state, as well as the threshold amount of time and the criteria for entering the suspend state are contained in the relevant USB specifications.

The method 1400 then proceeds to block 1406, where the upstream facing port 202 transmits a suspend detected message to the downstream facing port 204, and the downstream facing port 204 allows the connection to the USB device 108 to enter a suspend state.

At this point, both the connection between the upstream facing port 202 and the host 102, as well as the connection between the downstream facing port 204 and the device 108, are in a suspend state. This state may persist for an arbitrary amount of time. Subsequently, the method 1400 processes a reset event generated by the host 102, which contains actions similar to other methods discussed above.

The method 1400 proceeds to block 1408, where the upstream facing port 202 detects a beginning of a reset command from the host 102, and begins to negotiate a speed with the host 102. At block 1410, upon completion of the speed negotiation, the upstream facing port 202 transmits a reset detected message to the downstream facing port 204. As noted above, the reset detected message may include information indicating the speed negotiated with the host 102 for further processing by the downstream facing port 204.

At block 1412, in response to receiving the reset detected message, the downstream facing port 204 sets a reset extension flag and transmits a signal to the USB device 108 to begin an extended reset. Similar to the discussion above, the downstream facing port 204 continues to transmit one or more signals associated with the reset operation to the USB device 108 to extend the reset operation.

The method 1400 proceeds to block 1414, where the upstream facing port 202 detects the end of the reset command from the host 102, transmits a reset done message to the downstream facing port 204, and begins exchanging bus traffic with the downstream facing port 204. In some embodiments, the downstream facing port 204 may buffer the bus traffic until the connection with the USB device 108 is ready. At block 1416, in response to receiving the reset done message, the downstream facing port 204 clears the reset extension flag to allow the extended reset to complete in a manner that complies with the appropriate USB specification. Next, at block 1418, the downstream facing port 204 completes the reset with the USB device 108, and begins exchanging bus traffic with the USB device 108. The method 1400 then proceeds to an end block and terminates.

Figure 15A:
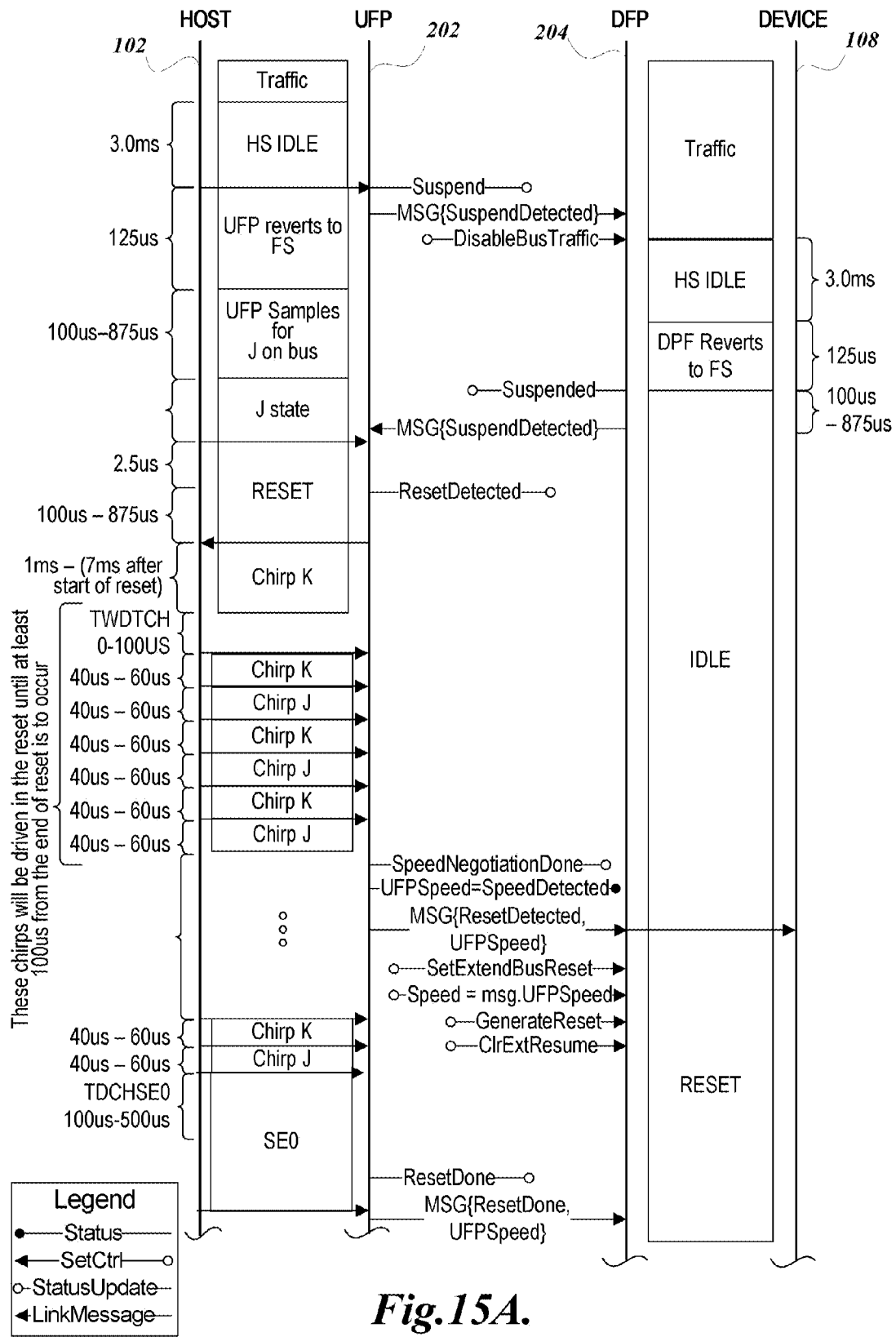
FIGS. 15A-15B are a sequence diagram that illustrates further details of signals and messages transmitted during an exemplary embodiment of a method similar to the method 1400 illustrated in FIG. 14, in a case where the speed negotiated with the USB device 108 is high speed.
Figure 15B:
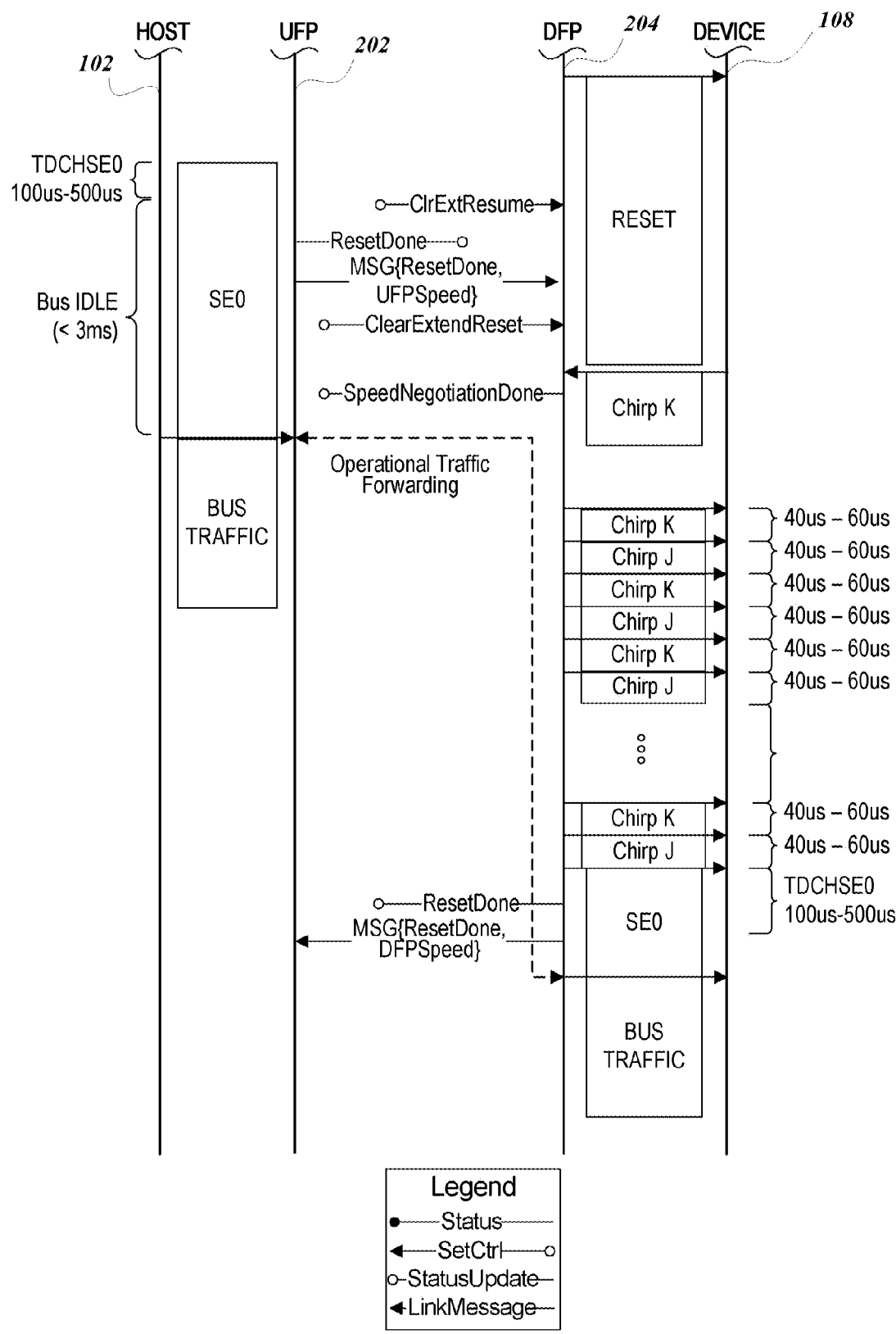
Figure 16:
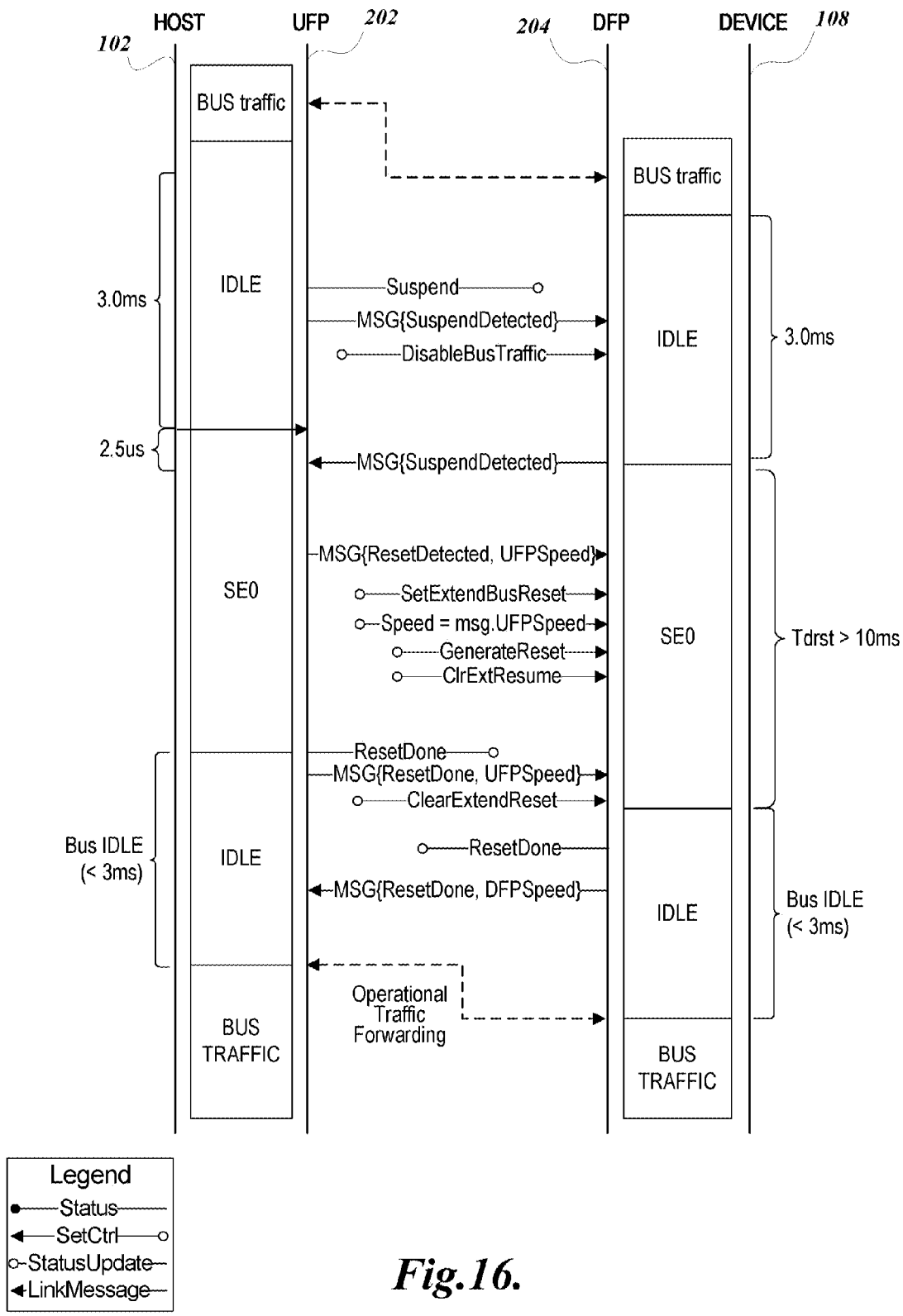
FIG. 16 is a sequence diagram that illustrates further details of signals and messages transmitted during an exemplary embodiment of a method similar to the method 1400 illustrated in FIG. 14, in a case where the speed negotiated with the USB device 108 is full speed or low speed.

FIGS. 15A-15B are a sequence diagram that illustrates further details of signals and messages transmitted during an exemplary embodiment of a method similar to the method 1400 illustrated in FIG. 14, in a case where the speed negotiated with the USB device 108 is high speed. FIG. 16 is a sequence diagram that illustrates further details of signals and messages transmitted during an exemplary embodiment of a method similar to the method 1400 illustrated in FIG. 14, in a case where the speed negotiated with the USB device 108 is full speed or low speed. The illustrated vertical lines, wavy continuation lines, arrows, open circle lines, closed circle lines, boxes, curly brace callouts, vertical sequence, vertical scale, and the like are similar to those discussed above with respect to FIGS. 6A-6B. As the above description is adequate for one of ordinary skill in the art to interpret the illustration of signals transmitted between the host 102, the UFP 202, the DFP 204, and the USB device 108 included in FIGS. 15A-15B and 16, no further textual description of FIG. 15A-15B or 16 is provided herein for the sake of brevity.

Figure 17:
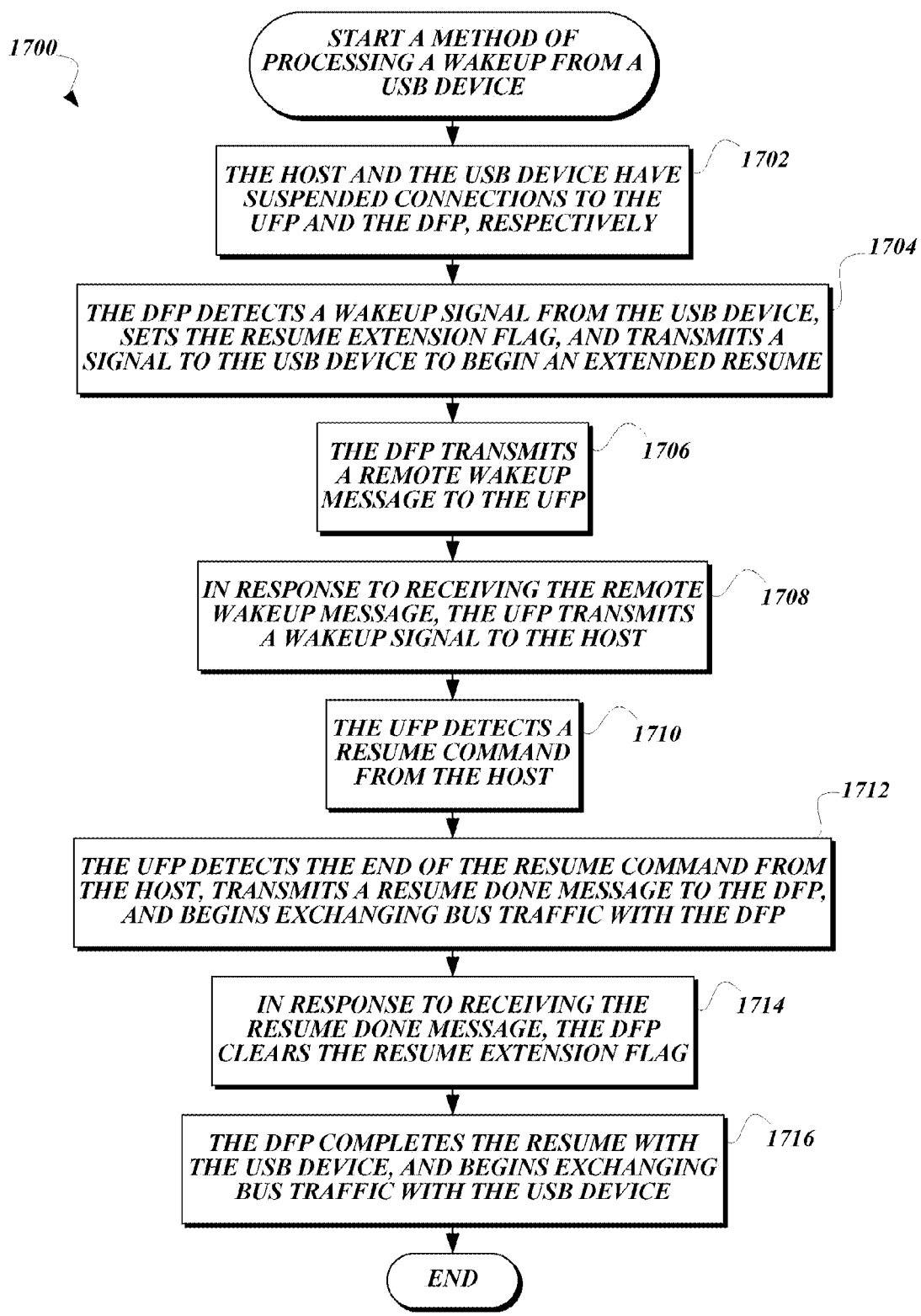
FIG. 17 is a flowchart that illustrates one embodiment of a method 1700 of processing a wakeup generated by the USB device 108 according to various aspects of the present disclosure.

FIG. 17 is a flowchart that illustrates one embodiment of a method 1700 of processing a wakeup generated by the USB device 108 according to various aspects of the present disclosure. The illustrated embodiment assumes that a network connection between the upstream facing port 202 and the downstream facing port 204 has previously been established. From a start block, the method 1700 proceeds to block 1702, where the host 102 and the USB device 108 have suspended connections to the upstream facing port 202 and the downstream facing port 204, respectively. Next, at block 1704, the downstream facing port 204 detects a wakeup signal from the USB device 108, sets the resume extension flag, and transmits a signal to the USB device 108 to begin an extended resume. Similar to the methods discussed above, the downstream facing port 204 continues to transmit one or more signals associated with the resume operation to extend the resume operation.

Next, at block 1706, the downstream facing port 204 transmits a remote wakeup message to the upstream facing port 202. At block 1708, in response to receiving the remote wakeup message, the upstream facing port 202 transmits a wakeup signal to the host 102. The method 1700 then proceeds to block 1710, where the upstream facing port 202 detects a resume command from the host 102. At block 1712, the upstream facing port 202 detects the end of the resume command from the host 102, transmits a resume done message to the downstream facing port 204, and begins exchanging bus traffic with the downstream facing port 204. The downstream facing port 204 may buffer the bus traffic until an appropriate time.

At block 1714, in response to receiving the resume done message, the downstream facing port 204 clears the resume extension flag to allow the resume to complete in a manner compliant with the applicable USB standard, similar to the discussion above. At block 1716, the downstream facing port 204 completes the resume with the USB device 108, and begins exchanging bus traffic with the USB device 108. The method 1714 then proceeds to an end block and terminates.

Figure 18:
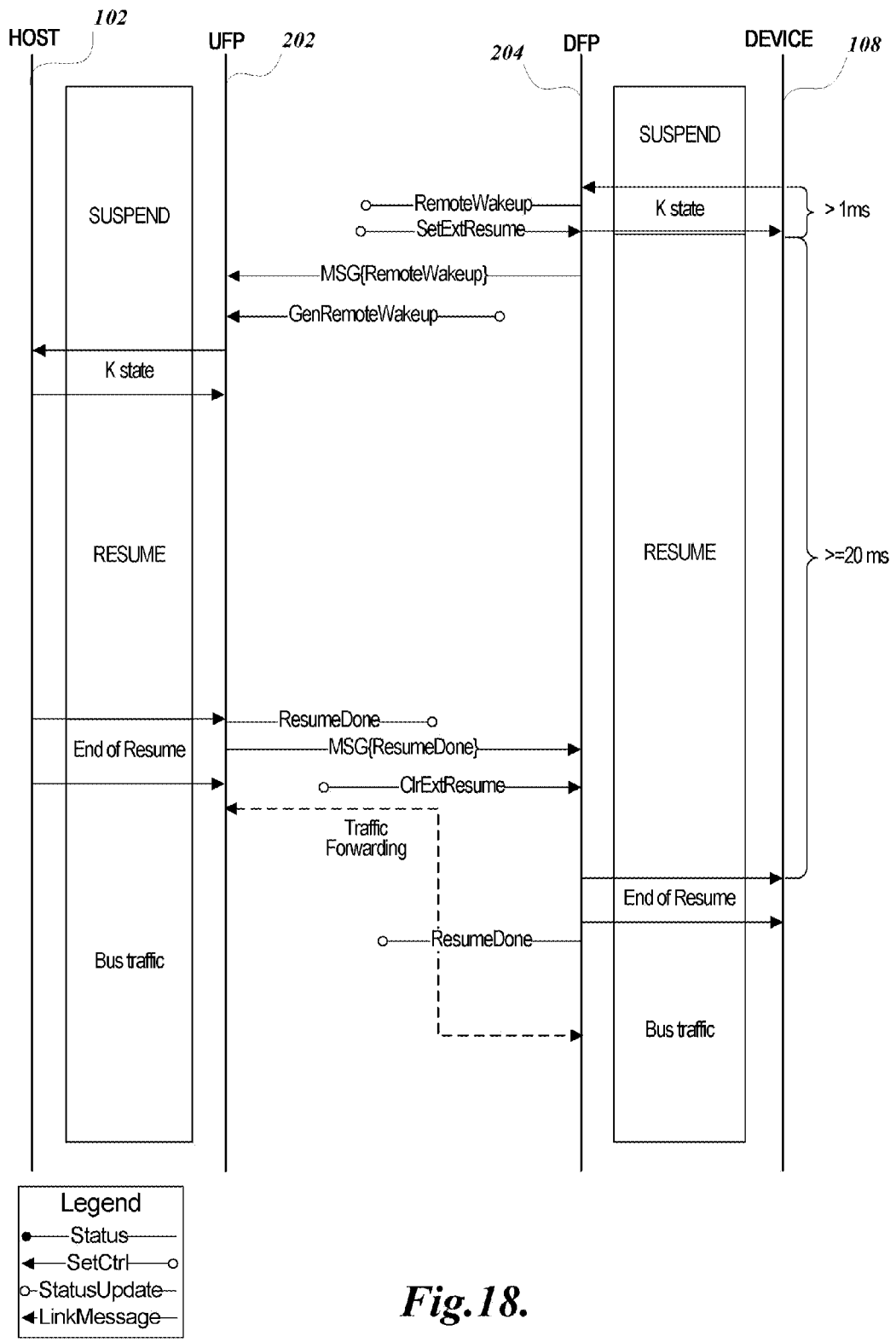
FIG. 18 is a sequence diagram that illustrates further details of signals and messages transmitted during an exemplary embodiment of a method similar to the method 1700 illustrated in FIG. 17.

FIG. 18 is a sequence diagram that illustrates further details of signals and messages transmitted during an exemplary embodiment of a method similar to the method 1700 illustrated in FIG. 17. The sequence diagram abstracts certain signals, such as resume signaling, to apply to embodiments wherein the USB device 108 connects to the downstream facing port 204 at high speed, full speed, or low speed. The illustrated vertical lines, arrows, open circle lines, closed circle lines, boxes, curly brace callouts, vertical sequence, vertical scale, and the like are similar to those discussed above with respect to FIGS. 6A-6B. As the above description is adequate for one of ordinary skill in the art to interpret the illustration of signals transmitted between the host 102, the UFP 202, the DFP 204, and the USB device 108 included in FIG. 18, no further textual description of FIG. 18 is provided herein for the sake of brevity.

While embodiments related to USB 1.0, USB 1.1, and/or USB 2.0 have been primarily described, the present disclosure is not limited to such protocols. For example, some embodiments of the present disclosure may also be used with later-released USB technologies, such as USB 3.0 and/or its successors, that are backwards-compatible with USB 1.0, USB 1.1, and/or USB 2.0.

While illustrative embodiments have been illustrated and described, it will be appreciated that various changes can be made therein without departing from the spirit and scope of the invention. For example, the particular components described herein are included for ease of discussion. In some embodiments, actions described herein as being associated with two or more components may be performed by a single component. In some embodiments, actions described herein as associated with a single component may be performed by two or more separate components. Further, each component may be associated with a separate computing device, a single component may be associated with more than one computing device, or a single computing device may be associated with more than one component. As another example, some of the method steps described above may be performed in a different order than that explicitly illustrated herein, or may be performed concurrently with other method steps that are illustrated herein as being performed in sequence.

The embodiments of the invention in which an exclusive property or privilege is claimed are defined as follows:

1. A computing device configurable to provide a downstream facing port (DFP) for allowing a USB device to communicate with a host via an upstream facing port (UFP), wherein the DFP is configured to:
   prefetch a speed of the USB device by:
      negotiating a speed with the USB device via a USB-compatible protocol; and
      allowing the USB device to enter a suspend state upon completion of the negotiation;
   transmit a connected message to the UFP, wherein the connected message includes an indication of the negotiated speed;
   transmit a signal to the USB device to initiate a reset in response to receiving a reset detected message from the UFP; and
   extend the reset at least until a reset done message is received from the UFP.

2. The computing device of claim 1, wherein the DFP is further configured to establish a communication link with the UFP using a communication protocol other than a USB protocol.

3. The computing device of claim 1, wherein the computing device is configured to communicate with the USB device using a USB 1.0-compatible protocol; a USB 1.1-compatible protocol; a USB 2.0-compatible protocol; or a protocol that is backward-compatible with USB 1.0, USB 1.1, or USB 2.0.

4. The computing device of claim 1, wherein a speed of the USB device is high speed, and wherein extending the reset includes transmitting chirp K/J pairs at least until the reset done message is received.

5. The computing device of claim 1, wherein the speed of the USB device is full speed or low speed, and wherein extending the reset includes driving SE0 at least until the reset done message is received.

6. The computing device of claim 1, wherein the computing device is a logic device or an application specific processor.

7. A method capable of propagating USB events between a host and a device over a distance greater than that allowed by the USB specification, the method comprising:

initiating a bus reset with the device;

prolonging the bus reset at least until a notification is received that a bus reset has been completed by the host, wherein prolonging the bus reset includes:

transmitting one or more signals to the device associated with a reset; and continuing to transmit the one or more signals at least until the notification is received that the bus reset has been completed by the host; and exchanging bus traffic with the device upon completion of the bus reset;

wherein the one or more signals includes a chirp K/J pair.

8. The method of claim 7, wherein the one or more signals includes driving SE0.

9. The method of claim 7, further comprising exchanging bus traffic with the device before initiating the bus reset.

10. The method of claim 7, further comprising placing the device in a suspend state before initiating the bus reset.

11. The method of claim 7, further comprising negotiating a speed with the device before initiating the bus reset.

12. A system for communication between a USB-compliant host and a USB-compliant device that are separated by a non-USB communication link, the system comprising:

an upstream facing port coupled to the host via a USB connection; and a downstream facing port coupled to the device via a USB connection and capable of establishing a communication link to the upstream facing port;

wherein the downstream facing port is configured to extend completion of a USB event with the device at least until a notification is received that a corresponding event has been completed between the upstream facing port and the host;

wherein the USB event is a resume command; and wherein the upstream facing port is configured to:

detect an initiation of a resume command from the host; and transmit a resume detected message to the downstream facing port.

13. The system of claim 12, wherein the downstream facing port is further configured to establish a communication link to the upstream facing port via a cable, a wired network, or a wireless network.

14. The system of claim 12, wherein the downstream facing port is further configured to:

enable the USB connection to the device;

negotiate a USB speed with the device;

allow the USB connection with the device to enter a suspend state; and transmit a connected message to the upstream facing port, the connected message including an indication of the USB speed.

15. The system of claim 14, wherein the upstream facing port is configured to:

receive the connected message; and negotiate a USB connection with the host at the USB speed indicated by the connected message.

16. A system for communication between a USB-compliant host and a USB-compliant device that are separated by a non-USB communication link, the system comprising:

an upstream facing port coupled to the host via a USB connection; and a downstream facing port coupled to the device via a USB connection and capable of establishing a communication link to the upstream facing port;

wherein the downstream facing port is configured to extend completion of a USB event with the device at least until a notification is received that a corresponding event has been completed between the upstream facing port and the host;

wherein the USB event is a reset command;

wherein the upstream facing port is configured to detect initiation of a reset command from the host and transmit a reset detected notification to the downstream facing port;

wherein extending completion of a USB event with the device includes receiving the reset detected notification from the upstream facing port, transmitting at least one signal to the device to begin a bus reset, and continuing to transmit the at least one signal associated with the bus reset until a reset done message is received; and wherein continuing to transmit the at least one signal associated with the bus reset comprises continuously transmitting chirp K/J pairs.

17. The system of claim 16, wherein continuing to transmit the at least one signal associated with the bus reset comprises continuously transmitting SE0.

18. The system of claim 16, wherein the upstream facing port is further configured to:

detect an end of the reset command from the host; and transmit a reset done message to the downstream facing port.

19. The system of claim 18, wherein extending completion of the USB event with the device further includes:

receiving the reset done message; and in response to receiving the reset done message, allowing the bus reset with the device to be completed.

20. The system of claim 12, wherein extending completion of a USB event with the device includes:

receiving the resume detected notification from the upstream facing port;

transmitting at least one signal to the device to begin a bus resume; and continuing to transmit the at least one signal to the device until a resume done message is received.

21. The system of claim 20, wherein the at least one signal transmitted to the device until a resume done message is received is a K state.

22. The system of claim 21, wherein the upstream facing port is further configured to:

detect an end of the resume command from the host; and transmit a resume done message to the downstream facing port.

23. The system of claim 22, wherein extending completion of the USB event with the device includes:

receiving the resume done message; and in response to receiving the resume done message, allowing the bus resume with the device to be completed.

24. A system for communication between a USB-compliant host and a USB-compliant device that are separated by a non-USB communication link, the system comprising:

an upstream facing port coupled to the host via a USB connection; and a downstream facing port coupled to the device via a USB connection and capable of establishing a communication link to the upstream facing port;

wherein the downstream facing port is configured to extend completion of a USB event with the device at least until a notification is received that a corresponding event has been completed between the upstream facing port and the host;

wherein the USB event is a remote wakeup, and wherein the downstream facing port is further configured to:

detect an initiation of a remote wakeup from the device;

transmit at least one signal associated with a bus resume to the device;

transmit a remote wakeup message to the upstream facing port; and continue to transmit the at least one signal associated with the bus resume to the device until a resume done message is received.

25. The system of claim 24, wherein the upstream facing port is configured to:

receive the remote wakeup message;

transmit a wakeup signal to the host;

detect a resume command from the host;

detect an end of the resume command from the host; and transmit a resume done message to the downstream facing port.

26. The system of claim 25, wherein the downstream facing port is further configured to:

receive the resume done message from the upstream facing port; and in response to receiving the resume done message from the upstream facing port, allowing the bus resume with the device to be completed.

27. A computing device configurable to provide a downstream facing port (DFP) for allowing a USB device to communicate with a host via an upstream facing port (UFP), wherein the DFP is configured to:

transmit a connected message to the UFP;

transmit a signal to the USB device to initiate a reset in response to receiving a reset detected message from the UFP; and extend the reset at least until a reset done message is received from the UFP;

wherein a speed of the USB device is high speed; and wherein extending the reset includes transmitting chirp K/J pairs at least until the reset done message is received.

28. The computing device of claim 27, wherein the DFP is further configured to establish a communication link with the UFP using a communication protocol other than a USB protocol.

29. The computing device of claim 27, wherein the computing device is configured to communicate with the USB device using a USB 1.0-compatible protocol; a USB 1.1.-compatible protocol; a USB 2.0-compatible protocol; or a protocol that is backward-compatible with USB 1.0, USB 1.1, or USB 2.0.

30. The computing device of claim 27, wherein the DFP is further configured to prefetch a speed of the USB device by:

negotiating a speed with the USB device via a USB-compatible protocol; and allowing the USB device to enter a suspend state upon completion of the negotiation;

wherein the connected message includes an indication of the negotiated speed.

31. The computing device of claim 27, wherein the computing device is a logic device or an application specific processor.

32. A method capable of propagating USB events between a host and a device over a distance greater than that allowed by the USB specification, the method comprising:

initiating a bus reset with the device;

prolonging the bus reset at least until a notification is received that a bus reset has been completed by the host; and exchanging bus traffic with the device upon completion of the bus reset;

wherein the method further comprises one or more of exchanging bus traffic with the device before initiating the bus reset or placing the device in a suspend state before initiating the bus reset.

33. The method of claim 32, wherein prolonging the bus reset includes:

transmitting one or more signals to the device associated with a reset; and continuing to transmit the one or more signals at least until the notification is received that the bus reset has been completed by the host.

34. The method of claim 33, wherein the one or more signals includes a chirp K/J pair.

35. The method of claim 33, wherein the one or more signals includes driving SE0.

36. The method of claim 32, further comprising negotiating a speed with the device before initiating the bus reset.

* * * * *